(12) United States Patent
Ross

(10) Patent No.: US 10,130,996 B2
(45) Date of Patent: Nov. 20, 2018

(54) FRICTION DRIVE LOCOMOTIVE WHEEL TRUING SYSTEM AND METHOD

(71) Applicant: HJR Equipment Rental inc., Bark River, MI (US)

(72) Inventor: Harold F. Ross, Bark River, MI (US)

(73) Assignee: HJR EQUIPMENT RENTAL INC., Bark River, MI (US)

( * ) Notice: Subject to any disclaimer, the term of this patent is extended or adjusted under 35 U.S.C. 154(b) by 0 days.

(21) Appl. No.: 15/632,617

(22) Filed: Jun. 26, 2017

(65) Prior Publication Data

US 2017/0368611 A1 Dec. 28, 2017

Related U.S. Application Data

(60) Provisional application No. 62/354,697, filed on Jun. 25, 2016, provisional application No. 62/406,444, filed on Oct. 11, 2016.

(51) Int. Cl.
| | |
|---|---|
| *B23B 5/28* | (2006.01) |
| *B23B 5/32* | (2006.01) |
| *B60L 11/18* | (2006.01) |
| *B23C 5/12* | (2006.01) |
| *B23C 3/02* | (2006.01) |
| *B23C 3/00* | (2006.01) |

(52) U.S. Cl.
CPC .................. *B23B 5/32* (2013.01); *B23C 3/02* (2013.01); *B23C 5/12* (2013.01); *B60L 11/18* (2013.01); *B23C 3/00* (2013.01); *B23C 2215/36* (2013.01); *B60L 2200/26* (2013.01); *B60L 2220/14* (2013.01)

(58) Field of Classification Search
CPC ......... B23B 5/32; B23B 5/28; B23B 2215/36; B23Q 9/0078; Y10T 82/185; Y10T 82/18
See application file for complete search history.

(56) References Cited

U.S. PATENT DOCUMENTS

| | | | | |
|---|---|---|---|---|
| 2,605,591 A | * | 8/1952 | Hill ........................... | B24B 5/46 451/1 |
| 3,345,890 A | * | 10/1967 | Dombrowski ............ | B23B 5/28 82/104 |
| 3,540,164 A | * | 11/1970 | Deceuster ................. | B23B 5/28 451/397 |
| 3,598,017 A | * | 8/1971 | Saari ......................... | B23B 5/28 409/165 |
| 3,848,513 A | | 11/1974 | Manyek | |
| 4,276,793 A | * | 7/1981 | Wirtz ......................... | B23B 5/32 82/1.11 |

(Continued)

*Primary Examiner* — Will Fridie, Jr.
(74) *Attorney, Agent, or Firm* — Device Patent LLC

(57) ABSTRACT

A frictional drive railway wheel truing system comprising a master lift and drive arm spaced from a slave lift and drive arm extending from within a railway pit for lifting a pair of opposed railway wheels off railway rails. Each master and slave drive assembly comprising frictional drums to turn a railway wheel from a wheel flange. A master and slave lathe assembly moveable along an axis parallel to a rotational axis of the frictional drums; each master and slave lathe assembly having a cutting bit positioned to engage a tread and a flange of a railway wheel in a cut mode at a location superior to the contact area of said frictional drums and railway wheel; and a hold down device fixing rotation of a railway wheel to a predetermined axis during a wheel truing operation.

20 Claims, 25 Drawing Sheets

(56) References Cited

U.S. PATENT DOCUMENTS

| | | | | |
|---|---|---|---|---|
| 4,347,769 A | * | 9/1982 | Dombrowski | B23B 5/32 82/104 |
| 4,669,292 A | * | 6/1987 | Brinkmann | B23B 5/32 29/803 |
| 4,674,370 A | * | 6/1987 | Gutohrlein | B23B 5/32 82/104 |
| 4,951,534 A | * | 8/1990 | Brinkmann | B23B 5/32 82/105 |
| 5,105,691 A | * | 4/1992 | Brinkmann | B23B 5/32 82/105 |
| 5,678,963 A | * | 10/1997 | Heimann | B23B 5/32 33/1 Q |
| 7,261,620 B2 | | 8/2007 | Boms et al. | |
| 8,408,105 B2 | | 4/2013 | Ross | |
| 2013/0042731 A1 | * | 2/2013 | Ross | B23B 5/32 82/1.11 |

* cited by examiner

FRICTION DRIVE LOCOMOTIVE WHEEL TRUING SYSTEM AND METHOD

CROSS REFERENCE TO RELATED APPLICATIONS

This application claims priority to Provisional Patent Application No. 62/354,697 filed Jun. 25, 2016, and to Provisional Patent Application No. 62/406,444 filed Oct. 11, 2016 the entire disclosures of which are hereby incorporated by reference and relied upon.

BACKGROUND OF THE INVENTION

Field of the Invention

The invention relates generally to wheel lathes, and more particularly to locomotive and other rail vehicle friction drive wheel lathe systems and methods.

Flats or other non-concentric imperfections on rail wheels are generally intolerable due to the excessive sound and vibration that is produced as a rail vehicle moves along a rail track. These imperfections tend to be more tolerable on freight cars than passenger cars, but in both cases reach a level in which repair of the wheel is necessary by removing imperfections in the tread and flange of the wheel.

Description of Related Art

Current wheel truing systems require the use of a specialized railway pit and are extremely expensive and not within the financial reach of many rail companies. Many of these systems require sliding rails configured to be slid out of the way to access a wheel targeted for truing. Portable wheel truing systems are significantly less expensive but are not equipped for truing wheels on railway freight cars or passenger cars since a power source is needed to rotate the wheels which neither freight nor passenger cars have. On a locomotive however, traction motor leads may be disconnected from the locomotive engine and reconnected to an alternative energy source such as a portable welder for DC motors or an AC frequency drive for AC motors. These electrical energy sources supply the wheel driving motors the energy needed to drive the wheel against the cutting tool of a lathe. A separate 220V source may be used to control movement of a lathe portion to cut a proper wheel profile across the tread of a wheel.

What is needed is a low cost rail wheel truing system that is adaptable and can operate within currently existing railway pits used within the rail industry and without the need for sliding rails out of the way of the wheel. Also, needed are systems that can simultaneously true a master side and slave side wheel of an axle.

SUMMARY OF THE INVENTION

In one form, a friction drive wheel truing system may be utilized on one or more of a single axle, a truck, a locomotive and other rail vehicle.

In one form, a friction drive locomotive wheel truing system may be used in pit applications or raised rail applications.

In one form, a friction drive locomotive wheel truing system utilizes a friction drive on the flange of a wheel to drive the wheel in rotation during truing by a cutting tool of a moveable wheel lathe.

In one form, a system indexes a lathe generally perpendicular to a railroad rail.

In one form, removable or sliding rail sections typically required in the prior art are unnecessary in the disclosed system since the system drives the wheel through frictional contact with a wheel's flange and the lathe is capable of indexing from the outside towards the inside to accommodate a specific position of the wheel.

In one form, a friction drive locomotive wheel truing system may be adapted to operate within existing railway pits to provide a less expensive alternative wheel truing system. This may be particularly advantageous to small railway companies.

In one form, a friction drive locomotive wheel truing system eliminates the need to jack up and remove wheel sets on non-motorized railway cars since the wheel can be trued without removal.

In one form, a friction drive locomotive wheel truing system requires significantly less set up time and removal time compared to portable wheel truing systems.

In one form, a friction drive locomotive wheel truing system comprises opposed master and slave lift and drive arms that are secured to opposed vertical pit walls. The opposed master and slave lift and drive arms including the covers over them are sufficiently spaced for a human to walk between the lift and drive arms while within a railway pit thereby eliminating a requirement for a technician to climb out of the railway pit, walk to the other side of the truing system then climbing back into the pit.

In one form, master and slave vertical mount plates and a main plate and master and slave drive arms and master and slave capture plate assemblies are manufactured in custom vertical heights and widths to accommodate fit into existing railway pits of various widths and heights. For example, the aforementioned components may be adapted to fit railway pits having vertical depths between 3 feet and 6 feet and sometimes deeper.

In one form, a truing system comprises a hold down assembly to secure a wheel about a predetermined axis during wheel truing regardless of the condition of the associated wheel flange.

In one form, sides of railroad rail, railroad cars, and parts of a friction drive locomotive wheel truing system are distinguished by use of the term 'master' and 'slave'.

In one form, a locomotive is positioned above a master railway rail and a slave railway rail over an open railway pit situated within a floor, a deck, or otherwise below ground.

In one form, disposed within a railway pit is a pit truing assembly comprising a master lift and drive arm and a slave lift and drive arm wherein each drive arms may have covers.

In one form, master and slave lift covers over a respective master lift and drive arm and a slave lift and drive arm are separated by a distance "F" which is sufficient for rail personnel to step therebetween when walking within a pit. In one form, distance "F" is at least 15 inches and preferably 21 to 22 inches.

In one form, a master hold down assembly and a slave hold down assembly each engage and fix a portion of a railway vehicle during lathe operations to prevent non-circular cutting profiles on a wheel tread. The hold down assemblies are utilized to maintain a consistent wheel center height and in some embodiments to minimize lateral movements of a railway wheel during wheel truing.

In one form, a hold down assembly may assume an array of configurations as required by the variety of wheel designs used on different locomotives, railway cars, and street cars.

In one form, a master and slave hold down assembly operates by moving the hold down assembly towards a corresponding rail wheel until it makes contact with a journal box side. The corresponding railway wheel is then lifted by a lift and drive arm until it abuts a clamp face on the hold down assembly to prevent any lateral movement in the axle and hold centered thus avoiding cutting of an oval shape with a lathe cutting tool.

In one form, a master lathe assembly and a slave lathe assembly comprise a cutting tool positioned to move across one or more of the tread and flange of a railway wheel for the removal of high spots and other imperfections that cause the wheel to introduce vibration when the wheel is in use in railway transportation operations.

In one form, at least one of a master and slave cutting tool engage one or more of a tread and a flange of a wheel at a position on the tread that is not directly vertically aligned with the wheel axis.

In one form, at least one of a master and slave cutting tool engage one or more of a tread and a flange of a wheel at a position on the tread that is frontally facing.

In one form, master and slave lathe assemblies are indexable lathes movable between a cut mode wherein a cutting tool blade of the lathe face a wheel tread surface, to a retracted mode wherein the lathe is positioned laterally away from the railroad rail therein providing for passage of the railway cars or locomotive along the railroad track.

In one form, a master upper assembly comprises a master hold down assembly and a master lathe assembly.

In one form, a slave upper assembly comprises a slave hold down assembly and a slave lathe assembly.

In one form, electrical power and signals are shared between components using insulated wires extending between the components.

In one form, power for a friction drive locomotive wheel truing system is received from a power input source which feeds to a main power switch then to a main operator panel.

In one form, one or more step down transformers are used where needed to adjust incoming voltage.

In one form, one recipient of power is at least one hydraulic power unit which provides hydraulic power through hydraulic lines to various hydraulic components in the system.

In one form, electrical and hydraulic energy (electrical/hydraulic lines) is passed through a first conduit channel and a second conduit channel extending through one or more of a master deck and slave deck.

In one form, a master hydraulic operator panel controls hydraulics to various hydraulically driven components on a master side such as a master lathe assembly and a master hold down assembly.

In one form, a slave hydraulic operator panel controls hydraulics to various hydraulically driven components on a slave side such as a slave lathe assembly and slave hold down assembly.

In one form, a locomotive pit preferably has one or more sets of stairs leading to the bottom of the locomotive pit.

In one form, a master stairway is located on a master side and a slave stairway is located on a slave side.

In one form, a single stairway is used and in alternative embodiments an elevator may be used to transport pit crew, components, and tools between a deck and pit floor.

In one form, a friction drive locomotive wheel truing system is a below floor (also termed a deck) version wherein a user's existing locomotive pit may be adapted to utilize a friction drive wheel truing system described herein.

In one form, a railway pit may be designed specifically to house a version of the disclosed friction drive wheel truing system.

In one form, a friction drive locomotive wheel truing system may be an above ground system wherein supported railways are distanced from one of a ground, floor, and deck level and wherein a railway pit is substantially at the ground level.

In one form, a mid-plane separates a master side and a slave side of a railway pit, rails, and friction drive wheel truing system.

In one form, a friction drive locomotive wheel truing system (FDLWTS) includes a generally horizontal main plate which assists to support both a master lift and drive arm and a slave lift and drive arm.

In one form, a master hold down assembly is moveable generally linearly along an axis which is generally perpendicular to a corresponding master railroad rail.

In one form, a slave hold down assembly is moveable generally linearly along an axis which is generally perpendicular to a corresponding slave railroad rail.

In one form, a master lathe assembly is positioned in front of a master hold down assembly and is moveable generally linearly along an axis which is generally perpendicular to a corresponding master rail.

In one form, a slave lathe assembly is positioned in front of a slave hold down assembly and is moveable generally linearly along an axis which is generally perpendicular to a corresponding slave rail.

In one form, both a master hold down assembly and master lathe assembly are secured to a master base plate which in turn is fixed to a master deck.

In one form, a master capture plate assembly resides in front of a master lift and drive arm.

In one form, a master lift cover covers internal mechanisms of a master lift and drive arm and a master capture plate assembly.

In one form, a slave capture plate assembly resides in front of a slave lift and drive arm.

In one form, a slave lift cover covers internal mechanisms of a slave lift and drive arm and slave capture plate assembly.

In one form, master and slave lift covers are telescoping in form.

In one form, a master lift and drive arm comprises a master drive assembly responsible for supporting a railway wheel during lifting and driving the wheel into rotation about a central wheel axis during a lathe operation when truing the wheel.

In one form, a master lift assembly elevates a master drive assembly and a corresponding railway wheel off a track during a raised mode and lowers a wheel to a corresponding master rail during a lowered mode.

In one form, a master drive assembly comprises one or more drum drive motors driving one or more frictional drums.

In one form, a master front drum drive motor drives a master front frictional drum, and a master rear drum drive motor drives a master rear frictional drum.

In one form, select master side components are mirrored across a central rail plane as slave side components.

In one form, a slave lift and drive arm comprises a slave drive assembly responsible for supporting a railroad wheel during lifting and driving the wheel into rotation about a central wheel axis during a lathe operation when truing the wheel.

In one form, a slave lift assembly elevates a slave drive assembly and a corresponding railroad wheel off a track during a raised mode and lowers a wheel to a corresponding slave rail during a lowered mode.

In one form, a slave drive assembly comprises one or more drum drive motors driving one or more frictional drums.

In one form, a slave front drum drive motor drives a slave front frictional drum, and a slave rear drum drive motor drives a slave rear frictional drum.

In one form, master and slave sides of; upper assemblies, and lift and drive arms, and capture plate assemblies are secured to a fixation housing.

In one form, a fixation housing comprises a plurality of rigid plates preferably made of metal each having a mount face for fixation of friction drive wheel truing system components on one side and a fixation face on an opposing side of the plate for mounting to a wall of a railway pit or floor.

In one form, a fixation housing comprises a master vertical mount plate having a master vertical mount face and opposed master vertical fixation face.

In one form, a fixation housing also comprises a slave vertical mount plate having a slave vertical mount face and opposed slave vertical fixation face.

In one form, a main plate comprising a main mount face and a main fixation face is positioned across a railway pit floor and extends between bottoms of a master vertical mount plate and slave vertical mount plate.

In one form, a master horizontal mount plate comprises a master horizontal mount face and opposing master horizontal fixation face.

In one form, a slave horizontal mount plate comprises a slave horizontal mount face and a slave horizontal fixation face.

In one form, a master horizontal mount plate and a slave horizontal mount plate are positioned against a main plate at respective intersections of the main plate with a master vertical mount plate and a slave vertical mount plate to provide strength and rigidity to the assembly.

In one form, a plurality of fastening holes extend through each of the plates of a fixation housing for the purpose of housing fasteners to join one plate to another and to join the plates to railway pit walls and floors or other support structure in above ground embodiments.

In one form, a master vertical mount plate is secured in a plane generally aligned with a vertical wall of a railway pit.

In one form, a slave vertical mount plate is secured in a plane generally aligned with an opposing vertical wall of a railway pit.

In one form, a main plate is secured in a plane generally aligned with a railway pit floor.

In one form, main plate a comprises a main mount face and an opposed main fixation face for fixation against a railway pit floor.

In one form, a master base plate is secured to a master deck and a slave base plate is secured to a slave deck wherein each of these plates reside in a generally horizontal plane.

In one form, a master base plate comprises a master base plate mount face and an opposed master base plate fixation face for securement to a master deck.

In one form, a slave base plate comprises a slave base plate mount face and an opposed slave base plate fixation face for securement to a slave deck.

In one form, a master hold down assembly is guided along an axis aligned with a mount face of a master base plate by cooperative interaction between a master hold down first guide and a master hold down second guide which may be in the form of a tongue and groove arrangement.

In one form, a master hold down power arm changes in length for positioning of a master clamp face on the power arm between a disengaged mode where it is distanced from a rail car, and an engaged mode where it is engaged with a portion of a rail vehicle to hold a railroad wheel centered during wheel truing operations.

In one form, power arms used in the system are hydraulically driven in the form of hydraulic cylinders.

In one form, a slave hold down assembly is guided along an axis aligned with a mount face of a slave base plate by cooperative interaction between a slave hold down first guide and a slave hold down second guide which may be in the form of a tongue and groove arrangement.

In one form, a slave hold down power arm changes in length for positioning of a slave clamp face on a hold down assembly between a disengaged mode where the clamp face is distanced from a rail car, and an engaged mode where it is engaged with a portion of a rail vehicle to hold a railroad wheel centered during wheel truing operations.

In one form, a master lathe assembly is guided along an axis aligned with a mount face of a master base plate by cooperative interaction between a master lathe first guide and a master lathe second guide which may be in the form of a tongue and groove arrangement.

In one form, a master lathe power arm changes in length for positioning of a master lathe cutting tool between a retracted mode where it is distanced from a railway wheel and a cut mode where the cutting tool can be engaged with a tread of a wheel during wheel truing operations.

In one form, a slave lathe assembly is guided along an axis aligned with a mount face of a slave base plate by cooperative interaction between a slave lathe first guide and a slave lathe second guide which may be in the form of a tongue and groove arrangement.

In one form, a slave lathe power arm changes in length for positioning of a slave lathe cutting tool between a retracted mode where it is distanced laterally from a railway wheel, and a cut mode where the cutting tool can be engaged with a tread of a wheel during wheel truing operations.

In one form, a master lathe control controls operations of a master lathe assembly to control cutting profile, depth, speed, and other lathe cutting operations of a master side railway wheel.

In one form, a slave lathe control controls operations of a master lathe assembly to control cutting profile, depth, speed, and other lathe cutting operations of a slave side railway wheel.

In one form, a unified lathe control controls both a master and slave lathe assembly.

In one form, a home position (mode) is defined as a position wherein; master and slave lift drive arms are in a lowered mode disengaged from a corresponding railway wheel flange, master and slave lathe assemblies are in a retracted mode distanced laterally from the respective rails along an axis perpendicular to the railroad rail, master and slave hold down assemblies are in a disengaged mode wherein they are retracted laterally from any portion of a railway vehicle along an axis, and master and slave capture plate assemblies are in an uncaptured mode distanced inferiorly from a plane on which the master and slave lathe assemblies retract.

In one form, located on a master side is a master beacon light for alerting a railway crew member the master side system status.

In one form, located on a slave side is a slave beacon light for alerting a crew member of the slave side system status.

In one form, status indication includes a variety of information including for example; an amber light indicating the corresponding friction drive locomotive wheel truing system (FDWTS) is in a home position and railway vehicles are free to move, a red light indicating the FDWTS is not in the home position and therefore associated railway vehicles are not free to move however neither a master or slave lathe assembly is currently cutting a wheel, and a red blinking light indicating a FDWTS is not in a home position and at least one of a master and slave lathe assembly is currently cutting a wheel, and thus associated railway vehicles are not free to move.

In one form in performance of wheel truing operations, a FDWTS moves out of a home mode to an operational mode. An operational mode is defined as positions wherein; master and slave lift drive arms are in a raised mode causing the frictional drums to lift the corresponding railway wheels above the corresponding railway track, and master and slave lathe assemblies are in a cut mode aligned in front of the corresponding railway wheel along an axis with cutting tool engaged with a wheel tread, and master and slave hold down assemblies are in an engaged mode wherein they are positioned medially along a generally horizontal axis and engaging a railway vehicle, and master and slave capture plate assemblies are in a captured mode wherein they are elevated such that a medial end of each master and slave lathe assembly is engaged with each respective master and slave capture plate to minimize vibration which each lathe assembly during wheel truing operations.

In one form, a master capture plate assembly comprises a master capture plate secured at a superior end of master capture lift arm. The master capture plate comprises a capture face for engaging with a medial end of a master lathe assembly for stabilization of the lathe assembly during wheel truing operations.

In one form, a master capture power arm is secured to a master vertical mount face and drives an inferior end of a master capture lift arm causing the lift arm to extend and retract under power to effectuate a master capture plate to move superiorly and inferiorly along a vertical axis.

In one form, a master capture guide is secured to a master vertical mount face and envelopes a portion of a master capture lift arm to maintain linear movement along a vertical axis.

In one form, a slave capture plate assembly comprises a slave capture plate secured at a superior end of a slave capture lift arm. The slave capture plate comprises a capture face for engaging with a medial end of a slave lathe assembly for stabilization of the lathe assembly during wheel truing operations.

In one form, a slave capture power arm is secured to a slave vertical mount face and drives an inferior end of a slave capture lift arm causing the lift arm to extend and retract under power to effectuate a slave capture plate to move superiorly and inferiorly along a vertical axis.

In one form, a slave capture guide is secured to a slave vertical mount face and envelopes a portion of a slave capture lift arm to maintain linear movement along a vertical axis.

In one form, a master lift and drive arm comprises a master drive assembly comprising a master drive housing secured to a superior end of a master lift strut.

In one form, a master drive housing supports one or more drum drive motors and aligned frictional drums along a horizontal axis perpendicular to a corresponding rail for lifting and lowering a master side railway wheel.

In one form, a master lift strut is partially enveloped in and moves within a master lift guide along a vertical axis.

In one form, a master lift guide is secured to a master vertical mount face.

In one form, an inferior end of a master lift strut is driven by a superior end of a master lift power arm which extends and contracts in length as needed to move along a vertical axis.

In one form, an inferior end of a master lift power arm is secured to a master main mount face or intermediate spacer.

In one form, a slave lift and drive arm comprises a slave drive assembly comprising a slave drive housing secured to a superior end of a slave lift strut.

In one form, a slave drive housing supports one or more drum drive motors and aligned frictional drums along a horizontal axis perpendicular to a corresponding rail for lifting and lowering a slave side railway wheel.

In one form, a slave lift strut is partially enveloped in and moves within a slave lift guide along a vertical axis.

In one form, a slave lift guide is secured to a slave vertical mount face.

In one form, an inferior end of a slave lift strut is driven by a superior end of a slave lift power arm which extends and contracts in length as needed to move along a vertical axis.

In one form, an inferior end of a slave lift power arm is secured to a slave main mount face or intermediate spacer.

In one form, a FDWTS engages with at least one of; a rail truck, a railway axle, a locomotive, and other railroad vehicle for railroad wheel truing.

In one form, a pair of master and slave lift power arms are utilized to cooperatively lift each respective master drive assembly and slave drive assembly.

In one form, a master horizontal mount plate and slave horizontal mount plate are configured to disperse forces from the weight of a rail car to the floor of a pit.

In one form, spaced frictional drums operate against the flange of a railway wheel positioned overhead thus lifting and distancing the wheel from a corresponding rail track.

In one form, a wheel is secured between a pair of spaced frictional drums and a holding device in an operational configuration.

In one form, drum drive motors coupled to each frictional drum are used to rotatably drive a drive surface of a frictional drum against the wheel flange therein causing the wheel to turn.

In one form, telescoping master and slave lift covers comprise an inner tube and an outer tube which are used over lifting mechanisms to protect users from internal moving parts and pinch points and to protect internal parts of the lift.

In one form, lowering of master and slave lift and drive arms causes a consequent lowering of a wheel on the railway rail and separates frictional drums from wheel flange surfaces in a lowered mode.

In one form, a master lathe power arm is utilized to position a movable master lathe between a retractable mode and a cut mode for cutting a wheel tread and flange.

In one form, a slave lathe power arm is utilized to position a movable slave lathe between a retracted mode and a cut mode for cutting a wheel tread and flange.

In one form, when one or more of a master and slave power arm is activated to move the corresponding lathe assembly towards a rail in a cut mode, a lathe cutting blade is positioned to face a tread of a railway wheel in preparation for cutting.

In one form, a movable lathe may be pivoted away or released from the mount platform as opposed to linear movement.

In one form, a master and a slave hold down assembly is utilized to secure the position of a wheel about a truing axis while providing counter force to maintain sufficient frictional opposition between an outer surface of a frictional drum and a flange of the wheel to be ground.

In one form, at least one of a master and slave hold down assembly engages a bearing along a horizontal axis using a live center to hold a railway wheel centered along the axis as a lift and drive arm elevates frictional drums against a corresponding wheel flange.

In one form, a live center of a journal bearing is used for receiving a complementary shaped master or slave clamp face into a holding device receiver portion of the journal bearing for maintaining the wheel position.

In one form, alternate hold down assembly positions may be used such as one or more of grasping of a surface of a journal box and an axle.

In one form, a moveable master or slave lathe assembly is electronically controlled for truing a tread and flange of a railway wheel by controlling a cutting path of a master or slave lathe cutting tool of a corresponding master or slave lathe assembly. In some forms, the electronic control is using a remote control.

In one form, each of a master and slave lathe assembly comprises two servos. An X-axis servo moves the cutting blade along an axis parallel to the wheel axle between a position internal to the wheel to positions external to the wheel. The Y-axis servo moves a cutting blade along an axis perpendicular to the wheel axle axis generally moving towards or away from the wheel axis.

In one form, computer control of an X-axis servo and Y-axis servo are by a master lathe control and slave lathe control to provide a precise computer controlled cutting path that can be followed during re-truing a railway wheel.

In one form, pre-configured cutting paths may be chosen that are particularly suited to differing wheel designs.

In one form, operation of a friction drive locomotive wheel truing system comprises a plurality of steps which may be grouped into distinct categories. A first category of steps is a pre-startup procedure. A second category is a system startup procedure. A third category is a system profile selection procedure. A fourth category is a system hydraulic setup procedure. A fifth category is a system homing procedure. A sixth category is a system cutting procedure. A seventh category is system hydraulic shutdown procedure. An eighth category is a system shutdown procedure.

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF SELECTED EMBODIMENTS OF THE INVENTION

Select embodiments of the invention will now be described with reference to the Figures. Like numerals indicate like or corresponding elements throughout the several views and wherein various embodiments are separated by letters (i.e. 100, 100B, 100C). The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

Figure 1:
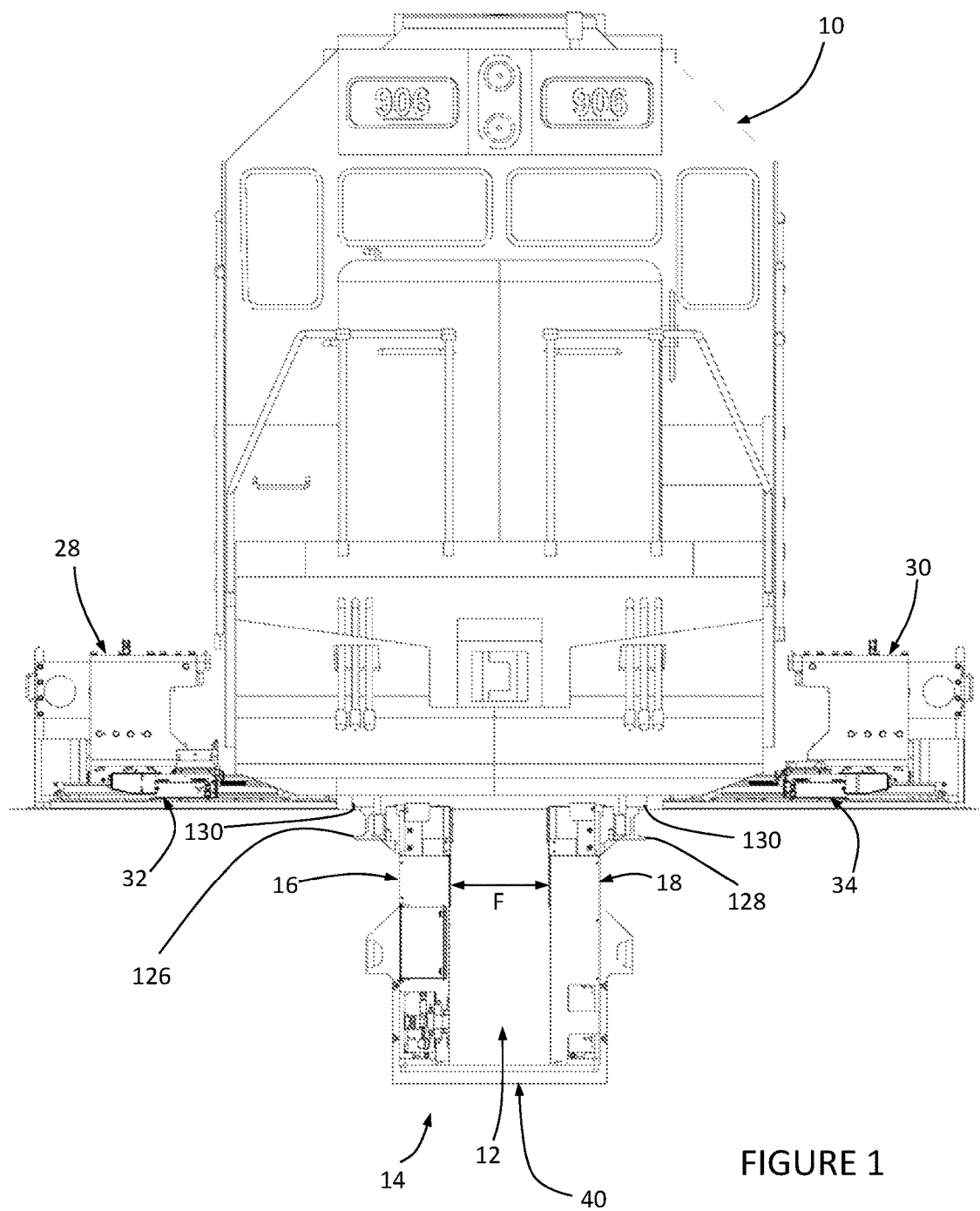
FIG. 1 depicts a front view of a locomotive parked over a railway pit illustrating a master and slave upper assembly portion and a pit truing assembly portion of a friction drive locomotive wheel truing system according to one or more embodiments shown and described herein.

FIG. 1 illustrates an in-ground embodiment of a portion of a friction drive locomotive wheel truing system (FDLWTS) according to one or more embodiments of the article of invention. Sides of rail, railway cars, and parts of a friction drive locomotive wheel truing system are distinguished by use of the term 'master' and 'slave'. In this embodiment a locomotive 10 is positioned above a master railway rail 126 and a slave railway rail 128 and over an open railway pit 12 situated within a floor, a deck, or otherwise below ground. Disposed within railway pit 12 is a pit truing assembly 14 comprising a master lift and drive arm 16 and a slave lift and drive arm 18 each drive arms having covers. In preferred embodiments, covers over master lift and drive arm 16 and slave lift and drive arm 18 are separated by a distance "F" which is sufficient for rail personnel to step therebetween when walking within a pit. A master hold down assembly 28 and a slave hold down assembly 30 each engage and fix a portion of a railway vehicle during lathe operations to prevent non-circular cutting profiles on a wheel tread. The hold down assemblies are utilized to maintain a consistent wheel center height and in some embodiments to minimize lateral movements of the wheel during wheel truing. The hold down assemblies may assume an array of configurations as required by the variety of wheel designs used on different locomotives, railway cars, or street cars.

A master lathe assembly 32 and a slave lathe assembly 34 comprise a cutting tool positioned to move across the tread and flange of a railway wheel 130 for the removal of high spots and other imperfections that cause the wheel to introduce vibration when the wheel is in use in railroad transportation operations. The master and slave lathe assemblies 32,34 are indexable lathes movable between a cut mode where blades of the lathe face a wheel tread surface to a retracted mode wherein the lathe is positioned away from the railway therein providing for passage of the railway cars or locomotive on the railroad tracks.

Figure 2:
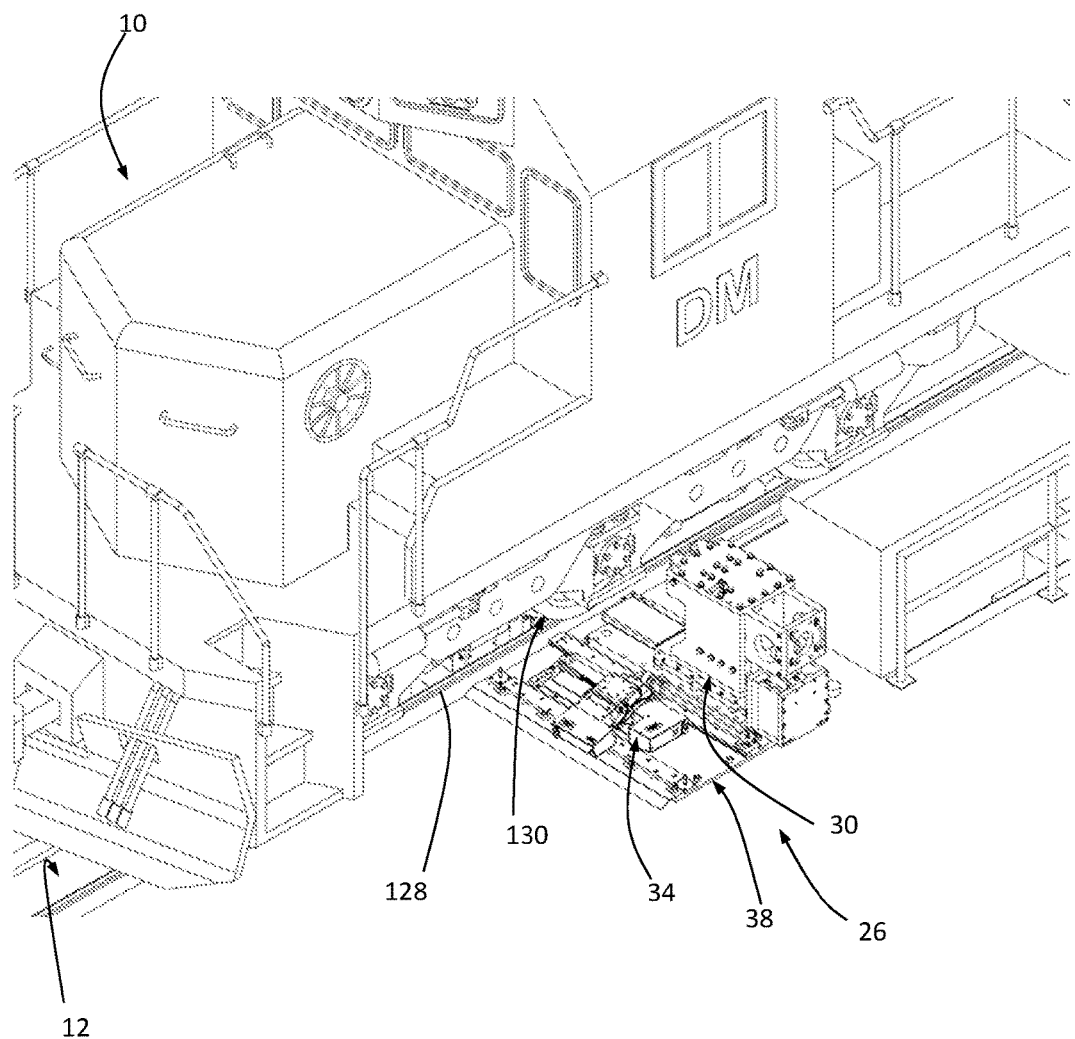
FIG. 2 depicts a top perspective view of a locomotive parked over a railway pit illustrating a slave upper assembly portion of a friction drive locomotive wheel truing system according to one or more embodiments shown and described herein.

FIG. 2 illustrates one embodiment of a locomotive 10 parked over a railway pit 12 with attention to a slave upper assembly 26. The slave upper assembly 26 comprises a slave hold down assembly 30 and a slave lathe assembly 34.

Figure 3:
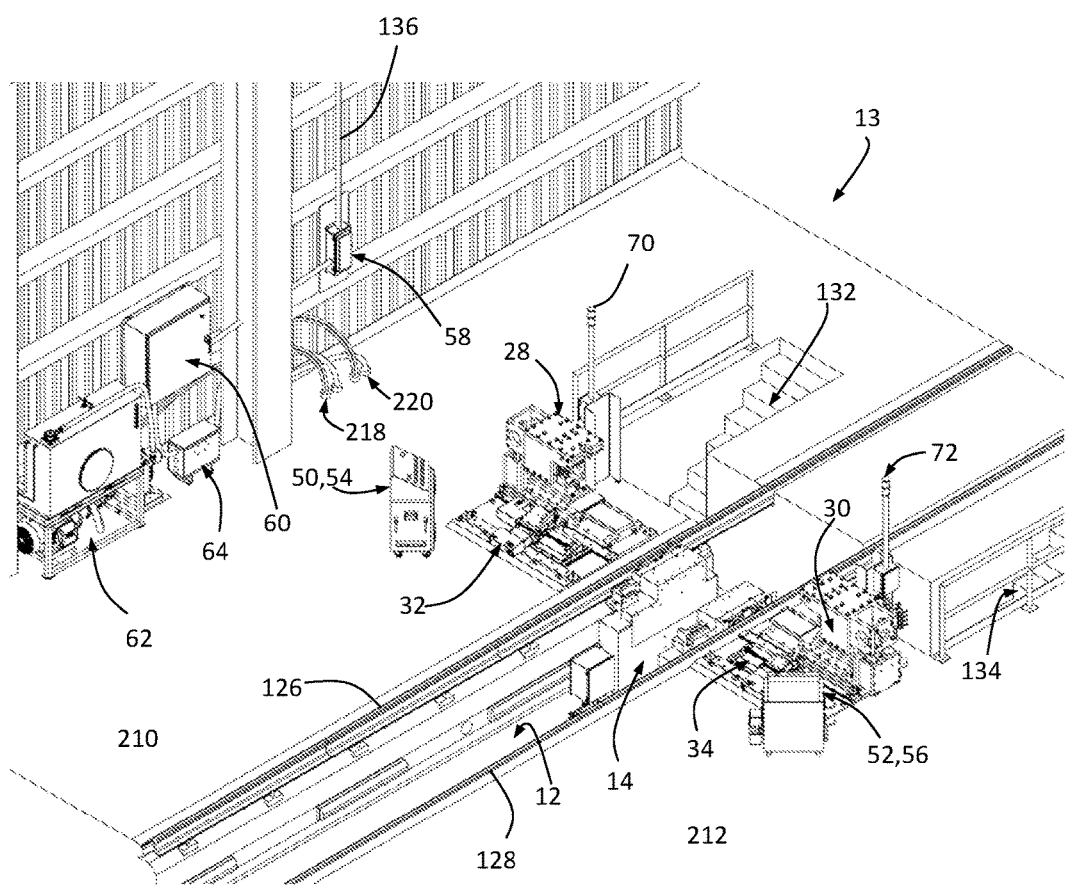
FIG. 3 depicts a top perspective view of a railway pit with a friction drive locomotive wheel truing system according to one or more embodiments shown and described herein.

FIG. 3 illustrates an array of components that are part of a friction drive locomotive wheel truing system 13 according to one embodiment of the invention. Power for the system is received from an electrical power input source 136 which feeds to a main power switch 58 then to a main operator panel 60. One or more step down transformers 64 are used where needed to adjust the incoming voltage. One recipient of this power is at least one hydraulic power unit 62 which provides hydraulic power through hydraulic lines to various hydraulic components in the system. Electrical and hydraulic energy (electrical/hydraulic transmission lines) in some embodiments is passed through a first conduit channel 218 and second conduit channels 220 extending through one or more of a master deck 210 and slave deck 212. Master hydraulic operator panel 50 controls hydraulics to various hydraulically driven components on the master side such as a master lathe assembly 32 and a master hold down assembly 28. Similarly, a slave hydraulic operator panel 52 controls hydraulics to various hydraulically driven components on the slave side such as a slave lathe assembly 34 and slave hold down assembly 30.

A locomotive pit 12 preferably has one or more sets of stairs leading to the bottom of the locomotive pit. As illustrated in FIG. 3, a master stairway 132 is located on a master side and a slave stairway 134 is located on a slave side. In some embodiments only a single stairway is used and in alternative embodiments an elevator may be used to transport pit crew, components, and tools between a deck and pit floor. The embodiment of a friction locomotive wheel truing system illustrated in FIG. 3 is a below floor (also termed a deck) version wherein a user's existing locomotive pit may be adapted to utilize a friction drive wheel truing system 13 described herein. In other embodiments, a railway pit may be designed specifically to house a version of the disclosed friction drive wheel truing system. In yet other embodiments, the system may be an above ground system wherein supported railways are distanced from one of a ground, floor, and deck level and wherein a railway pit is substantially at the ground level.

Figure 4:
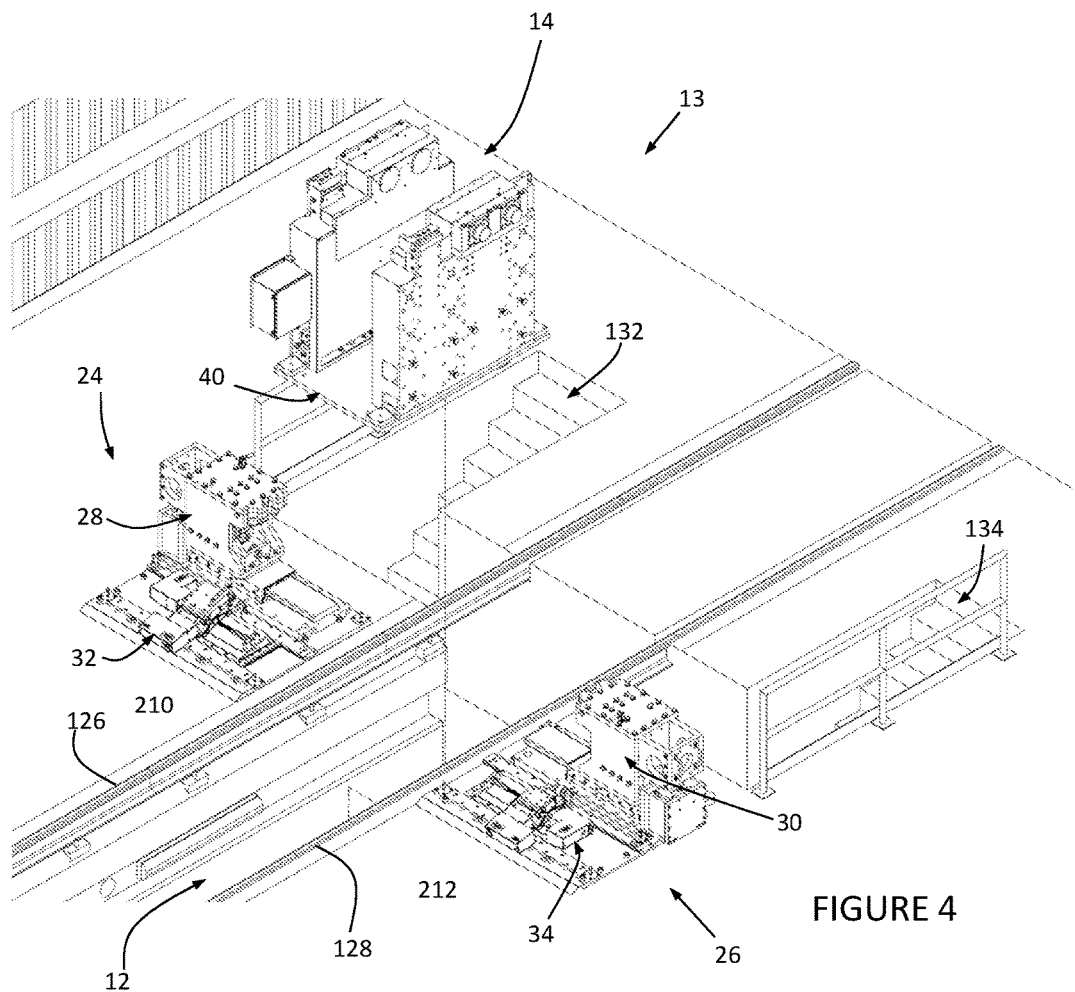
FIG. 4 depicts a perspective exploded view of a portion of a railway pit with a master upper assembly and slave upper assembly and pit truing assembly according to one or more embodiments shown and described herein.
Figure 5:
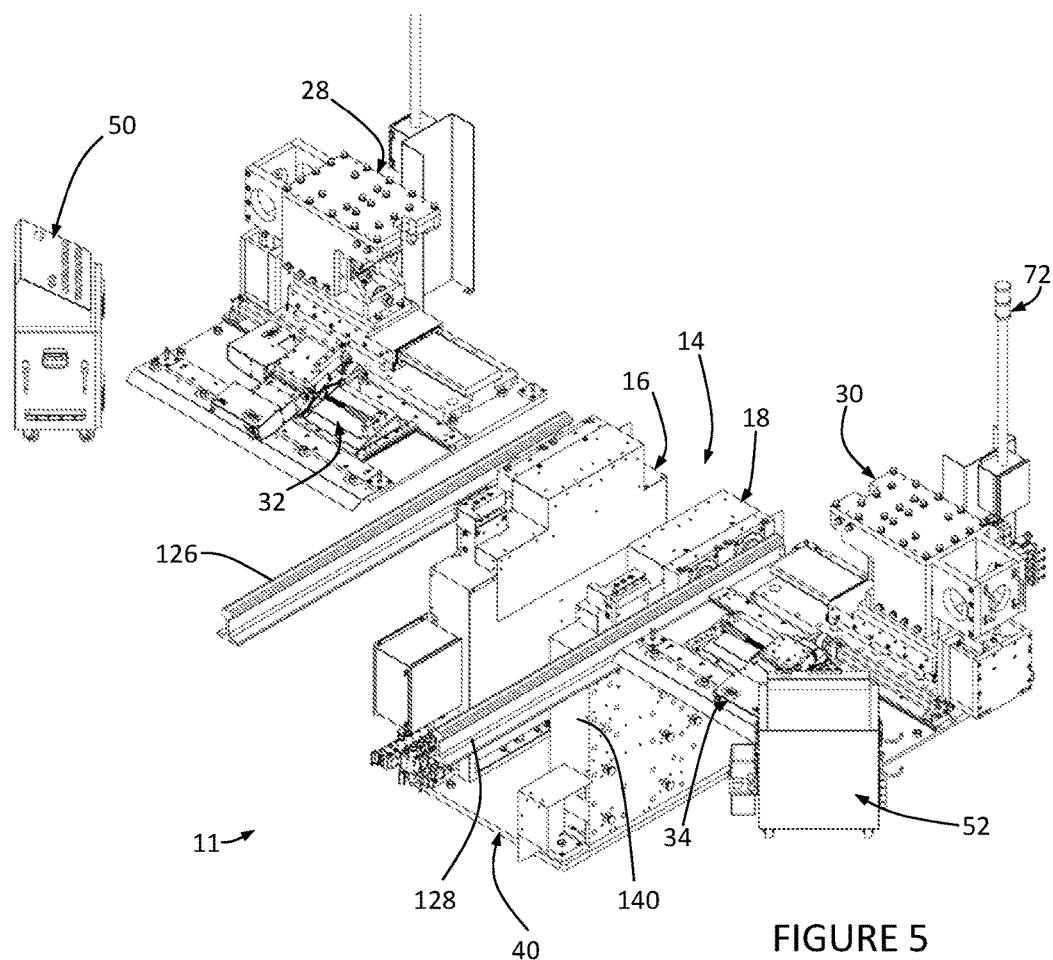
FIG. 5 depicts a partial top perspective view of a railway pit including a master upper assembly, a slave upper assembly, a pit truing assembly, and master and slave hydraulic operation panels according to one or more embodiments shown and described herein.

FIG. 4 illustrates major portions of a friction drive locomotive wheel truing system 13 with a pit truing assembly portion 14 in an elevated position from a railway pit 12 for viewing purposes. FIG. 5 illustrates a closer view of these major assemblies.

Figure 6:
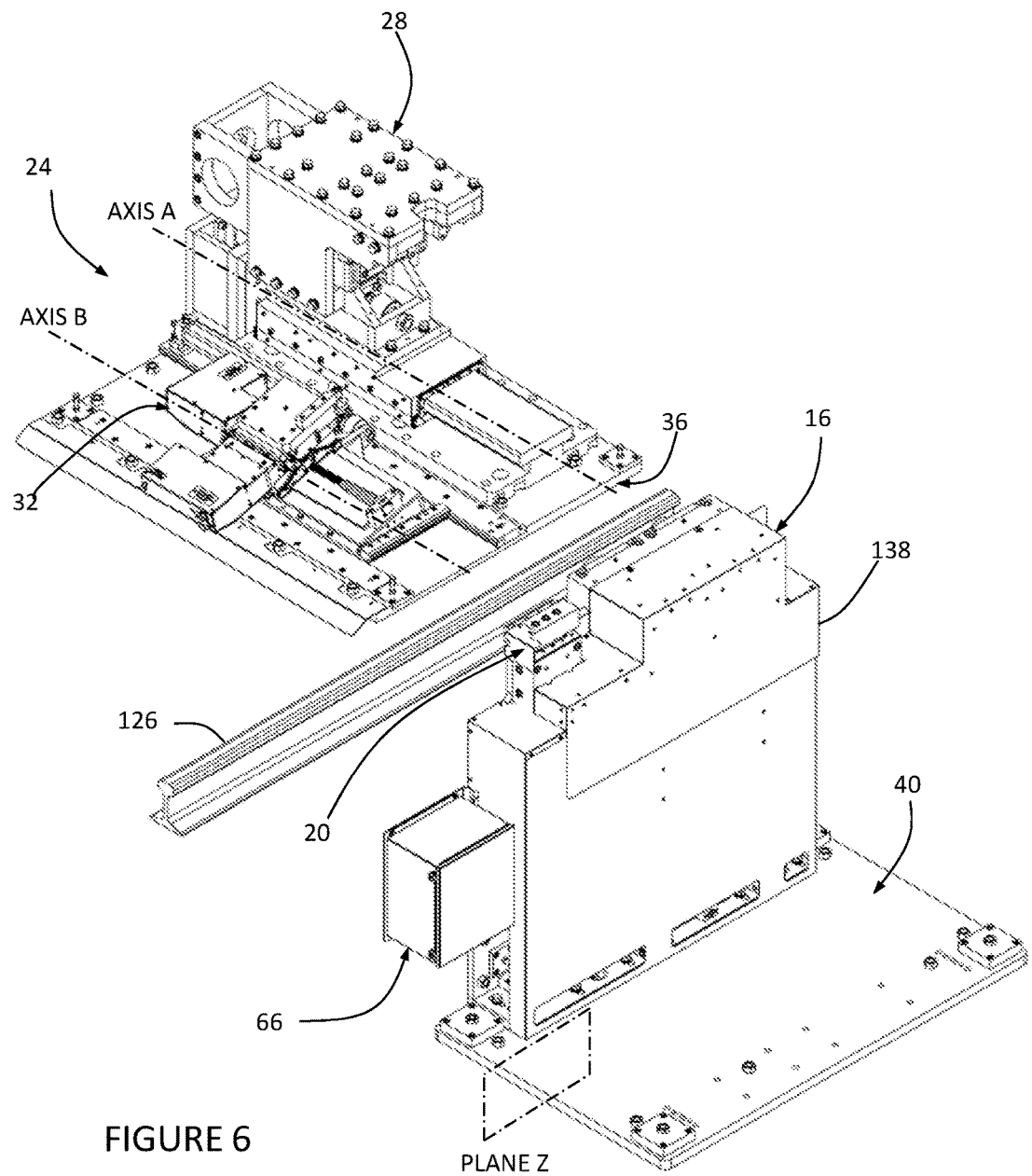
FIG. 6 depicts a top perspective view of a master upper assembly and a master lift and drive arm according to one or more embodiments shown and described herein.
Figure 10:
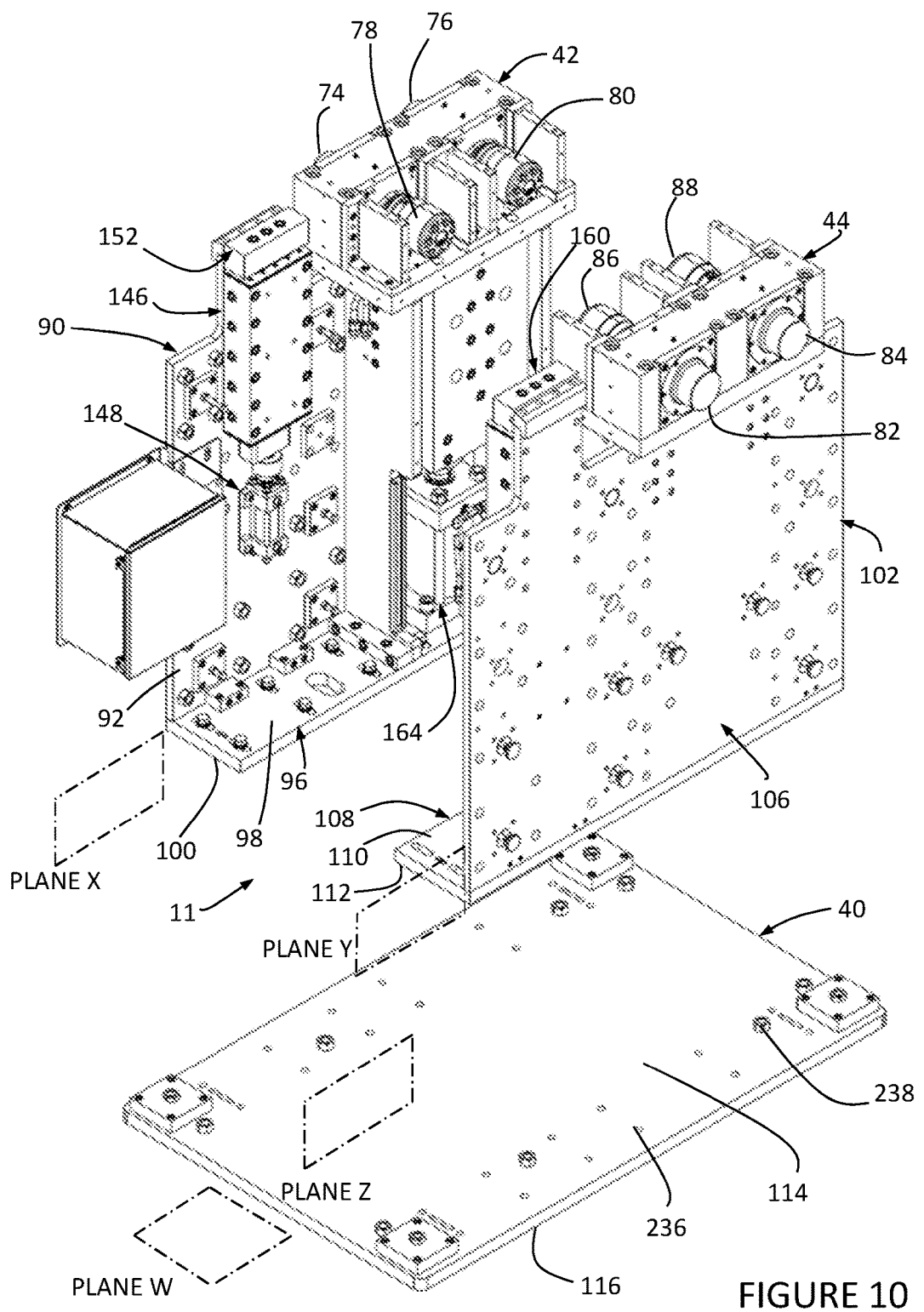
FIG. 10 depicts a top perspective exploded view of a pit truing assembly according to one or more embodiments shown and described herein.

As illustrated in FIG. 10, plane Z separates a master side and a slave side of a railway pit, rails, and friction drive wheel truing system 13. Preferred embodiments include a main plate 40 which assists to support both a master lift and drive arm 16 and a slave lift and drive arm 18. FIG. 6 illustrates master lift and drive arm 16 and master upper assembly 24. A master hold down assembly 28 is moveable generally linearly along axis A which is generally perpendicular to a corresponding master rail 126. Similarly, a master lathe assembly 32 is positioned in front of hold down assembly 28 and is moveable generally linearly along axis B which is also generally perpendicular to corresponding master rail 126. In this embodiment, both a master hold down assembly 28 and master lathe assembly 32 are secured to a master base plate 36 which in turn is fixed to a master deck 210. A master capture plate assembly 20 resides in front of master lift and drive arm 16. A master lift cover 138 covers the internal mechanisms of master lift and drive arm 16 and master capture plate assembly 20. A slave capture plate assembly 22 resides in front of a slave lift and drive arm 18. A slave lift cover 140 covers the internal mechanisms of slave lift and drive arm 18 and slave capture plate assembly 22. In some embodiments master and slave lift covers 138,140 are telescoping in form.

Figure 7:
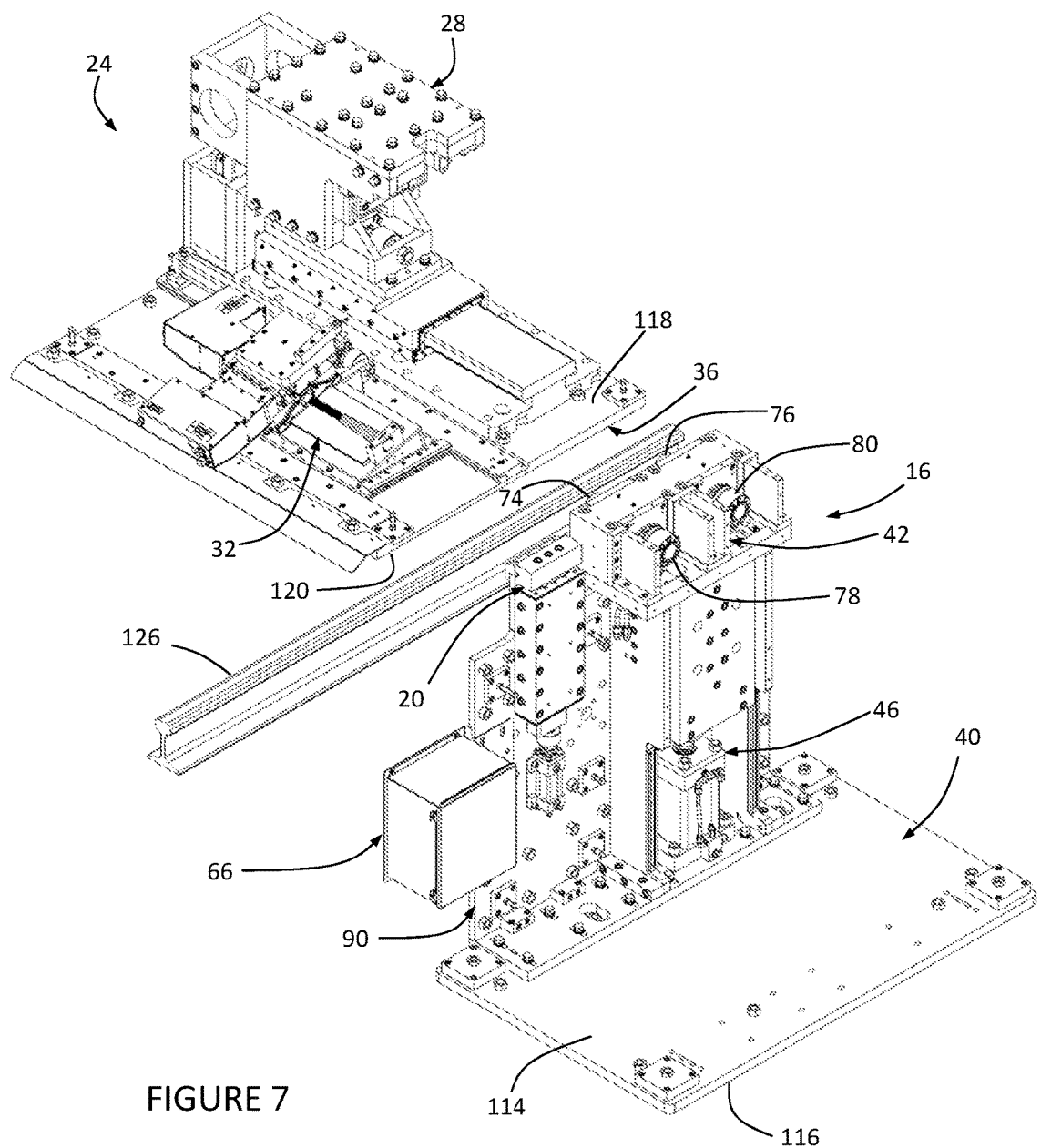
FIG. 7 depicts a top perspective view of a master upper assembly and a master lift and drive arm with master lift cover removed according to one or more embodiments shown and described herein.

FIG. 7 depicts the assemblies illustrated in FIG. 6 with master lift cover 138 removed and exposing various internal components. A master lift and drive arm 16 comprises a master drive assembly 42 responsible for supporting a railway wheel 130 during lifting and driving the wheel into rotation about a central wheel axis during a lathe operation when truing the wheel. Master lift assembly 46 elevates master drive assembly 42 and a corresponding railway wheel 130 off a track during a raised mode and lowers a wheel 130 to a corresponding master rail 126 during a lowered mode. Master drive assembly 42 comprises one or more drum drive motors driving one or more frictional drums. In this embodiment, master front drum drive motor 78 drives master front frictional drum 74, and master rear drum drive motor 80 drives master rear frictional drum 76.

Figure 12:
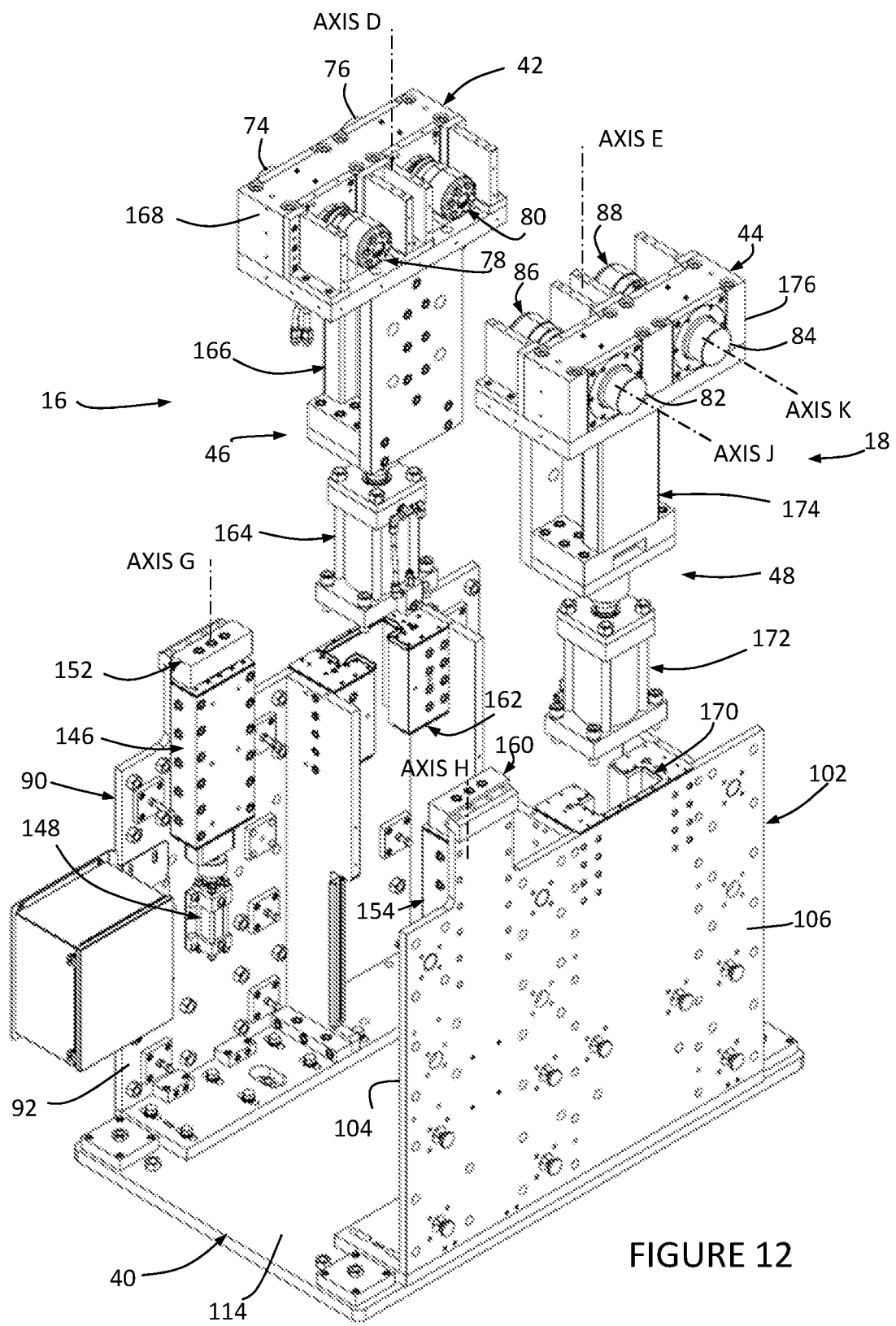
FIG. 12 depicts a top perspective exploded view of master and slave lift and drive arm assemblies of a pit truing assembly according to one or more embodiments shown and described herein.

As illustrated in FIG. 10 and in exploded view in FIG. 12, most master side components are mirrored across plane Z as slave side components. A slave lift and drive arm 18 comprises a slave drive assembly 44 responsible for supporting a railway wheel 130 during lifting and driving the wheel into rotation about a central wheel axis during a lathe operation when truing the wheel. Slave lift assembly 48 elevates slave drive assembly 44 and a corresponding railway wheel 130 off a track during a raised mode and lowers a wheel 130 to a corresponding slave rail 128 during a lowered mode. Slave drive assembly 44 comprises one or more drum drive motors driving one or more frictional drums. In this embodiment, slave front drum drive motor 86 drives slave front frictional drum 82, and slave rear drum drive motor 88 drives slave rear frictional drum 84.

In preferred embodiments, master and slave sides of; upper assemblies 24,26, and lift and drive arm 16, 18, and capture plate assemblies 20, 22 are secured to fixation housing 11. Fixation housing 11 comprises an assortment of rigid plates preferably made of metal having a mount face for fixation of friction drive wheel truing system 13 components on one side and a fixation face for mounting to a wall of a railway pit or floor on an opposing side of the plate. Fixation housing 11 comprises a master vertical mount plate 90 having a master vertical mount face 92 and opposed master vertical fixation face 94. Fixation housing 11 also comprises a slave vertical mount plate 102 having a slave vertical mount face 104 and opposed slave vertical fixation face 106. A main plate 40 comprising a main mount face 114 and a main fixation face 116 is positioned across a railway pit floor and extends between bottoms of master vertical mount plate 90 and slave vertical mount plate 102. A master horizontal mount plate 96 comprises a master horizontal mount face 98 and opposing master horizontal fixation face 100. A slave horizontal mount plate 108 comprises a slave horizontal mount face 110 and a slave horizontal fixation face 112. Master horizontal mount plate 96 and slave horizontal mount plate 108 are positioned against main plate 40 at respective intersections of main plate 40 with master vertical mount plate 90 and slave vertical mount plate 102 to provide strength and rigidity to the assembly. A plurality of fastening holes 236 extend through each of the plates for the purpose of using fasteners 238 to join one plate to another and to join plates to railway pit walls and floors or other support structure in above ground embodiments. In this embodiment, master vertical mount plate 90 is secured in a plane X generally aligned with a vertical wall of a railway pit 12. Slave vertical mount plate 102 is secured in a plane Y generally aligned with an opposing vertical wall of a railway pit 12. Main plate 40 is secured in a plane W generally aligned with railway pit 12 floor. Main plate 40 also comprises a main mount face 114 and an opposed main fixation face 116 (FIG. 10) for fixation against a railway pit 12 floor.

Figure 8:
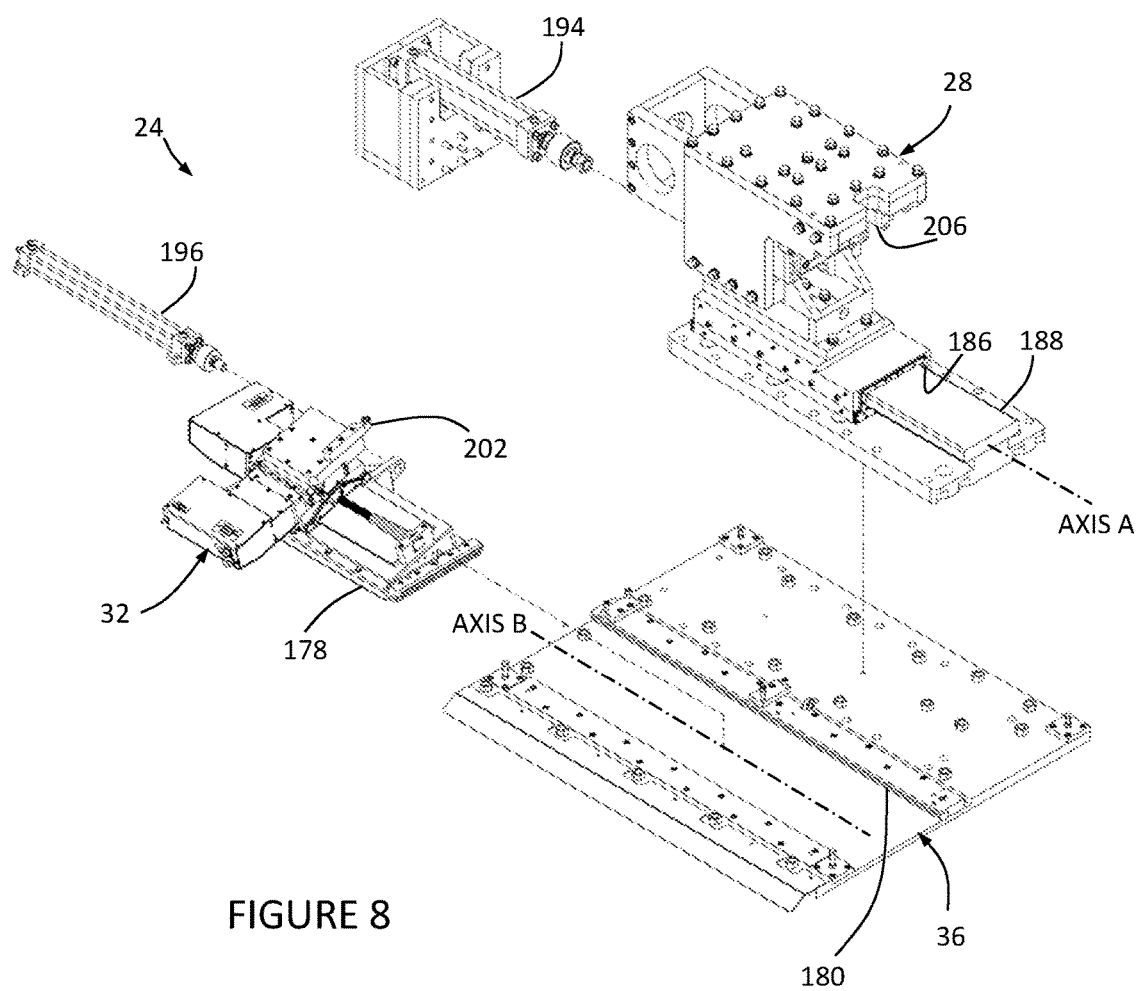
FIG. 8 depicts a top perspective exploded view of a master upper assembly according to one or more embodiments shown and described herein.

Master base plate 36 is secured to master deck 210 and slave base plate 38 is secured to slave deck 212 wherein each of these plates reside in generally horizontal plane R. Master base plate 36 comprises a master base plate mount face 118 and an opposed master base plate fixation face 120 for securement to a master deck 210. Slave base plate 38 comprises a slave base plate mount face 122 and an opposed slave base plate fixation face 124 for securement to a slave deck 212. In this embodiment and as illustrated in FIG. 8, master hold down assembly 28 is guided along axis A of master base plate 36 by cooperative interaction between master hold down first guide 186 and master hold down second guide 188 which here are in the form of a tongue and groove arrangement. Master hold down power arm 194 changes in length for positioning of master clamp face 206 between a disengaged mode where it is distanced from a rail vehicle, and an engaged mode where it is engaged with a portion of a rail vehicle to hold it during wheel truing operations. In preferred embodiments each power arm is hydraulically driven.

Figure 9:
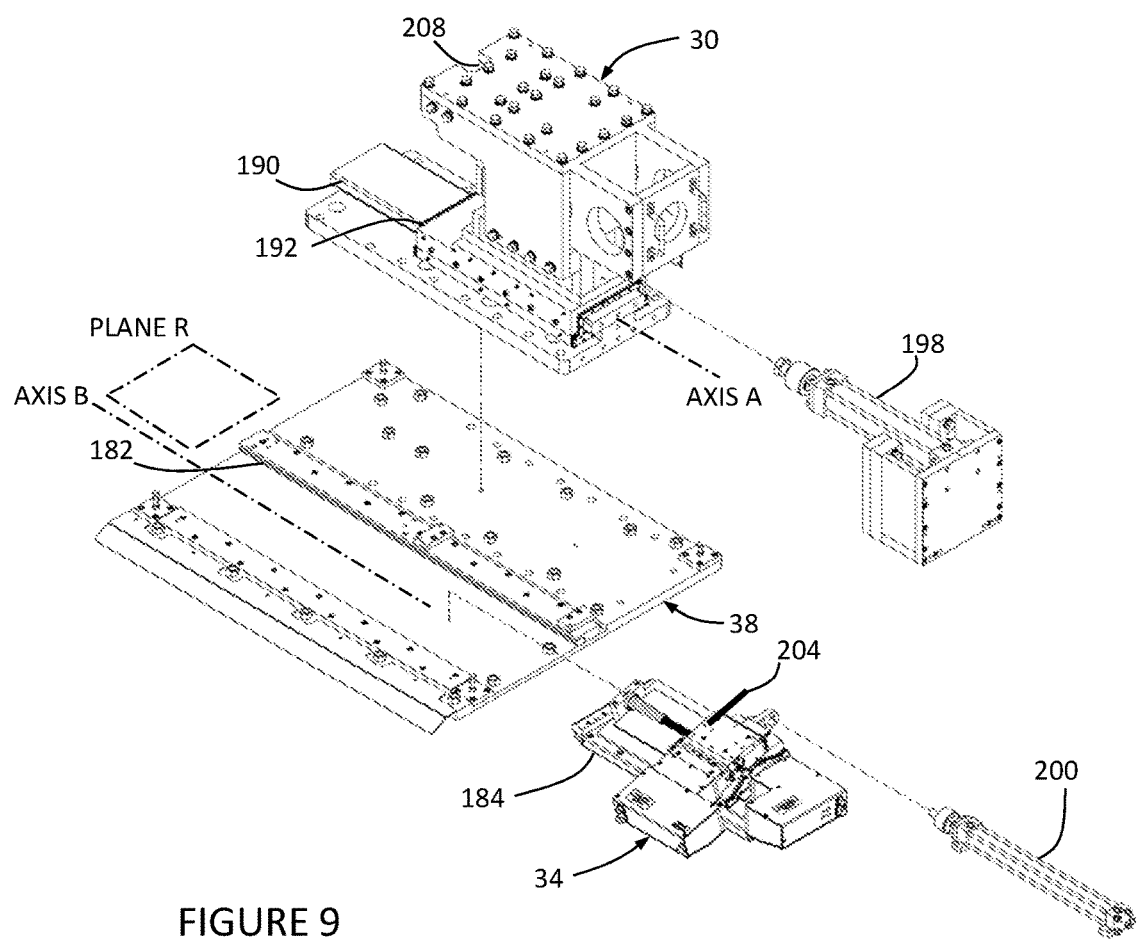
FIG. 9 depicts a top perspective exploded view of a slave upper assembly according to one or more embodiments shown and described herein.

In this embodiment and as illustrated in FIG. 9, slave hold down assembly 30 is guided along axis A by cooperative interaction between slave hold down first guide 190 and slave hold down second guide 192 which here is also in the form of a tongue and groove arrangement. Slave hold down power arm 198 changes in length for positioning of slave clamp face 208 between a disengaged mode where it is distanced from a rail car, and an engaged mode where it is engaged with a portion of a rail vehicle to hold it during wheel truing operations.

In this embodiment and as illustrated in FIG. 8, master lathe assembly 32 is guided along axis B by cooperative interaction between master lathe first guide 178 and master lathe second guide 180 which here is in the form of a tongue and groove arrangement. Master lathe power arm 196 changes in length for positioning of master lathe cutting tool 202 between a retracted mode where it is distanced from a railway wheel, and a cut mode where it can be engaged with a tread of a wheel during wheel truing operations.

In this embodiment and as illustrated in FIG. 9, slave lathe assembly 34 is guided along axis B by cooperative interaction between slave lathe first guide 182 and slave lathe second guide 184 which here is also in the form of a tongue and groove arrangement. Slave lathe power arm 200 changes in length for positioning of slave lathe cutting tool 204 between a retracted mode where it is distanced from a railway wheel, and a cut mode where it can be engaged with a tread of a wheel during wheel truing operations.

Master lathe control 54 controls operations of master lathe assembly 32 to control cutting profile, depth, speed, and other lathe cutting operations of a master side railway wheel 130. Similarly, slave lathe control 56 controls operations of master lathe assembly 32 to control cutting profile, depth, speed, and other lathe cutting operations of a slave side railway wheel 130. A home position (mode) is defined as a position wherein; master and slave lift drive arms 16,18 are in a lowered mode disengaged from the railway wheel, and master and slave lathe assemblies 32,34 are in a retracted mode distanced laterally from the respective rails along axis B, and master and slave hold down assemblies 28,30 are in a disengaged mode wherein they are retracted laterally from any portion of a railway vehicle along axis A, and master and slave capture plate assemblies 20,22 are in an uncaptured mode distanced inferiorly from a plane in which master and slave lathe assemblies translate.

Located on a master side is a master beacon light 70 for alerting a railway crew member the master side system status. Located on a slave side is a slave beacon light 72 for alerting a crew member of the slave side system status. Status indication may include a variety of information including for example an amber light indicating the corresponding friction drive locomotive wheel truing system 13 (FDWTS) is in the home position and railway vehicles are free to move, and a red light indicating the FDWTS is not in the home position and therefore associated railway vehicles are not free to move however neither a master or slave lathe assembly is currently cutting a wheel, and a red blinking light indicating a FDWTS is not in a home position and at least one of a master and slave lathe assembly is currently cutting a wheel, and thus associated railway vehicles are not free to move.

In performance of wheel truing operations, an FDWTS moves out of the home mode to an operational mode. An operational mode is defined as positions wherein; master and slave lift drive arms 16,18 are in a raised mode causing the frictional drums to lift the corresponding railway wheels above the corresponding railroad track, and master and slave lathe assemblies 32,34 are in a cut mode aligned in front of the corresponding railway wheel along axis B with cutting tool engaged with a wheel tread, and master and slave hold down assemblies 28,30 are in an engaged mode wherein they are positioned medially along axis A and engaging a railway vehicle, and master and slave capture plate assemblies 20,22 are in a captured mode wherein a master and slave capture plate 152, 160 with each having a capture face 153 engages medial ends of a corresponding master and slave lathe assembly 32,32 for stabilization during lathe operations.

Figure 11:
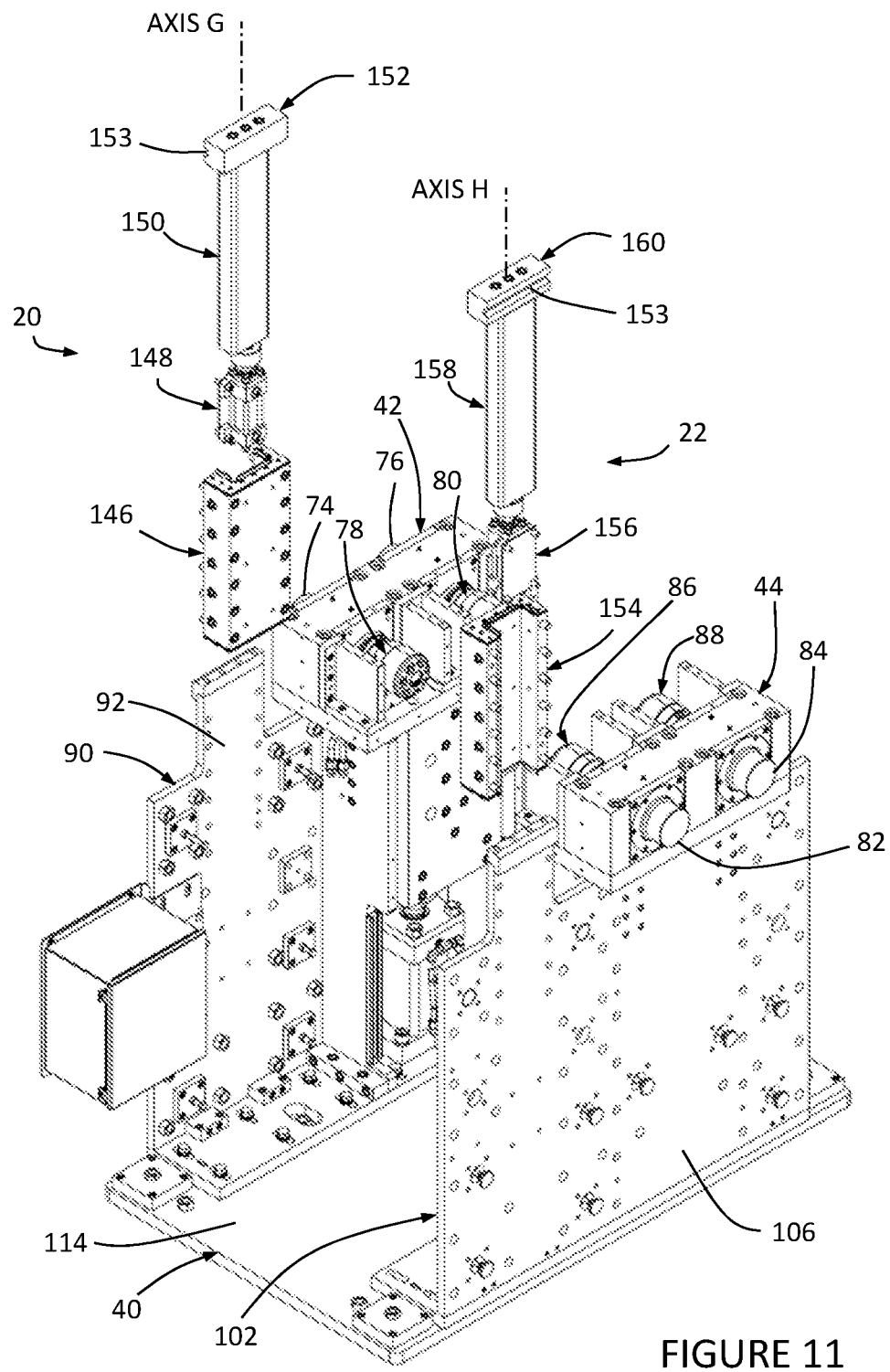
FIG. 11 depicts a top perspective exploded view of master and slave capture plate assemblies of a pit truing assembly according to one or more embodiments shown and described herein.

FIG. 11 illustrates one embodiment of a master capture plate assembly 20 and slave capture plate assembly 22. Master capture plate assembly 20 comprises master capture plate 152 secured at a superior end of master capture lift arm 150. Capture face 153 in this embodiment is in the form of a horizontal groove to seat a plate portion of a lathe but may assume other engagement profiles suited to stabilize the lathe. Master capture power arm 148 is secured to master vertical mount face 92 and drives an inferior end of master capture lift arm 150 causing the lift arm to extend and retract under power to effectuate master capture plate 152 to move superiorly and inferiorly along axis G. Master capture guide 146 is secured to master vertical mount face 92 and envelopes a portion of master capture lift arm 150 to maintain linear movement along axis G. Slave capture plate assembly 22 comprises slave capture plate 160 secured at a superior end of slave capture lift arm 158. Capture face 153 in this embodiment is in the form of a horizontal groove but may assume other engagement profiles suited to stabilize the lathe. Slave capture power arm 156 is secured to slave vertical mount face 104 and drives an inferior end of slave capture lift arm 158 causing the lift arm to extend and retract under power to effectuate slave capture plate 160 to move superiorly and inferiorly along axis H. Slave capture guide 154 is secured to slave vertical mount face 104 and envelopes a portion of slave capture lift arm 158 to maintain linear movement along axis H.

FIG. 12 illustrates one embodiment of a master lift and drive arm 16 and a slave lift and drive arm 18. Master lift and drive arm 16 comprises a master drive assembly 42 comprising a master drive housing 168 secured to a superior end of a master lift strut 166. Master drive housing 168 supports one or more drum drive motors 78,80 and aligned frictional drums 74,76 along an axis (J,K) perpendicular to a corresponding rail for lifting and lowering a master side railway wheel. In this embodiment, master lift strut 166 is partially enveloped in and moves within master lift guide 162 along axis D. Master lift guide 162 is secured to master vertical mount face 92. An inferior end of master lift strut 166 is driven by a superior end of master lift power arm 164 which extends and contracts in length as needed to move along axis D. An inferior end of master lift power arm 164 is secured to main mount face 114 or intermediate spacer.

Slave lift and drive arm 18 comprises a slave drive assembly 44 comprising a slave drive housing 176 secured to a superior end of a slave lift strut 174. Slave drive housing 176 supports one or more drum drive motors 86,88 and aligned frictional drums 82,84 along an axis (J,K) perpendicular to a corresponding rail for lifting and lowering a slave side railway wheel. In this embodiment, slave lift strut 174 is partially enveloped in and moves within slave lift guide 170 along axis E. Slave lift guide 170 is secured to slave vertical mount face 104. An inferior end of slave lift strut 174 is driven by a superior end of slave lift power arm 172 which extends and contracts in length as needed to move along axis E. An inferior end of slave lift power arm 172 is secured to main mount face 114 or intermediate spacer.

Figure 13:
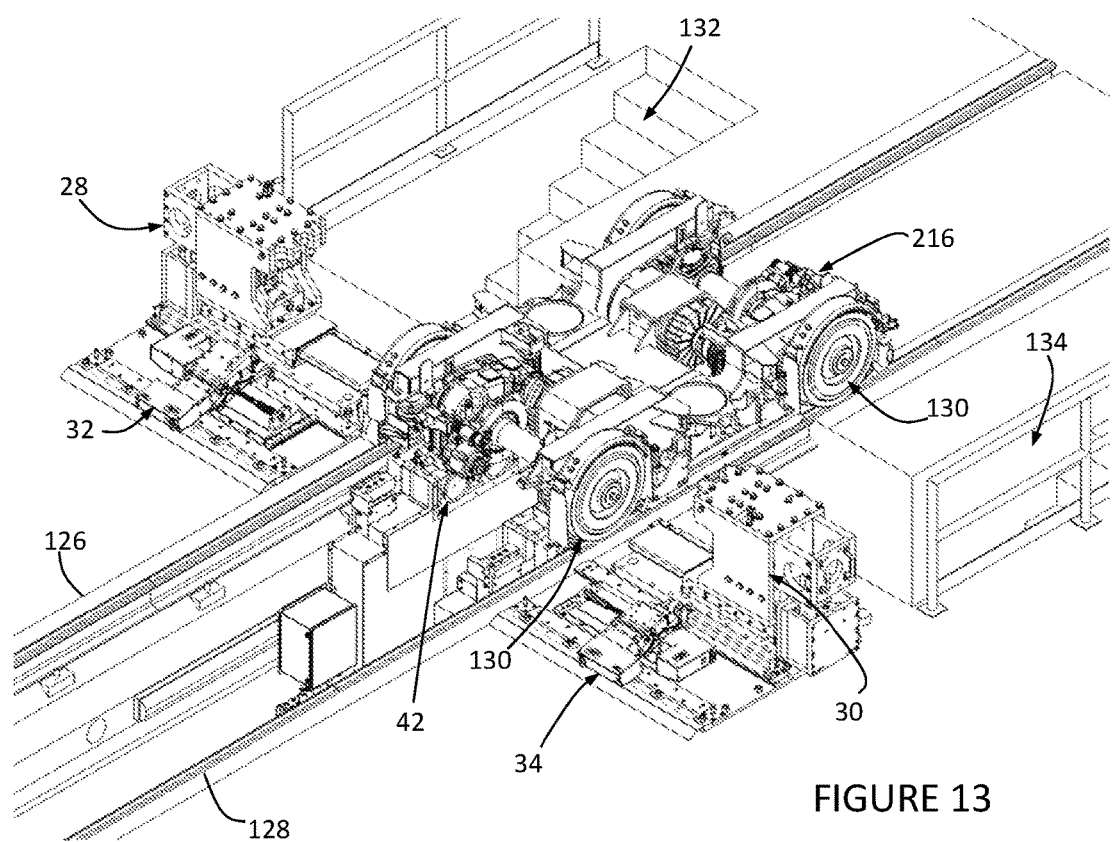
FIG. 13 depicts a top perspective view of a railway truck parked over a railway pit and engaged with a master upper assembly and a slave upper assembly with a pit truing assembly located within a pit according to one or more embodiments shown and described herein.
Figure 14:
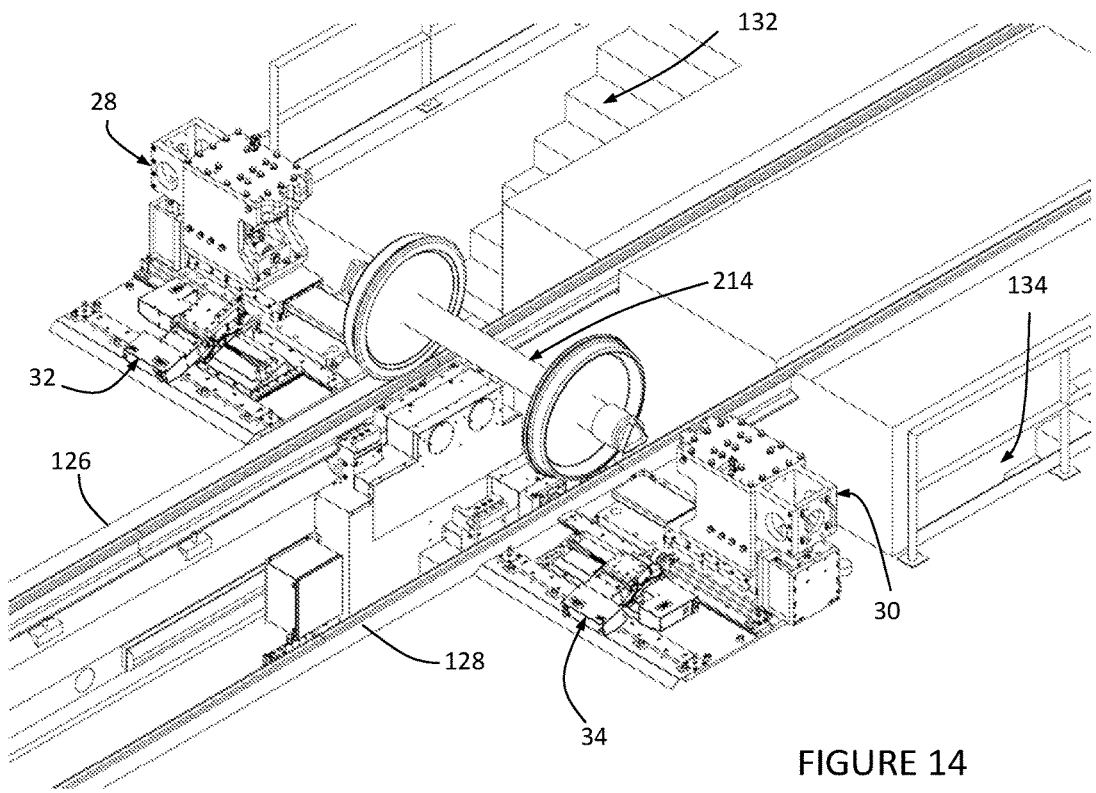
FIG. 14 depicts a top perspective view of a single rail axle with wheels parked over a railway pit and engaged with a master upper assembly and a slave upper assembly with a pit truing assembly located within a pit according to one or more embodiments shown and described herein.
Figure 14B:
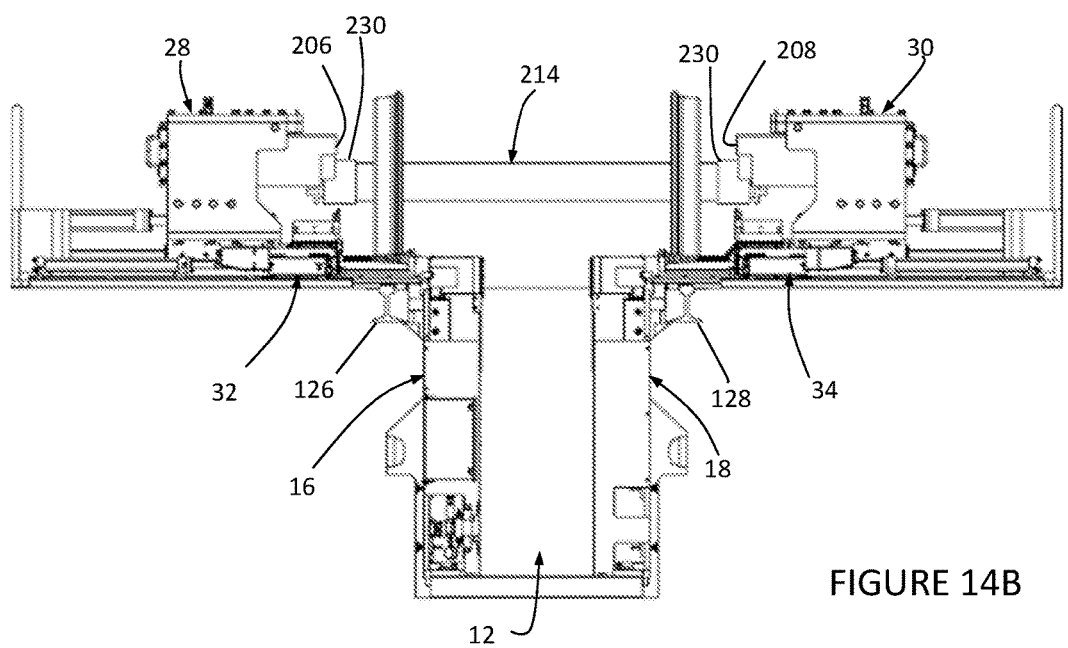
FIG. 14B depicts a front view of the single rail axle of FIG. 14 with both master and slave hold down assembly engaged with journal bearings of the axle to prevent movement during truing.
Figure 14C:
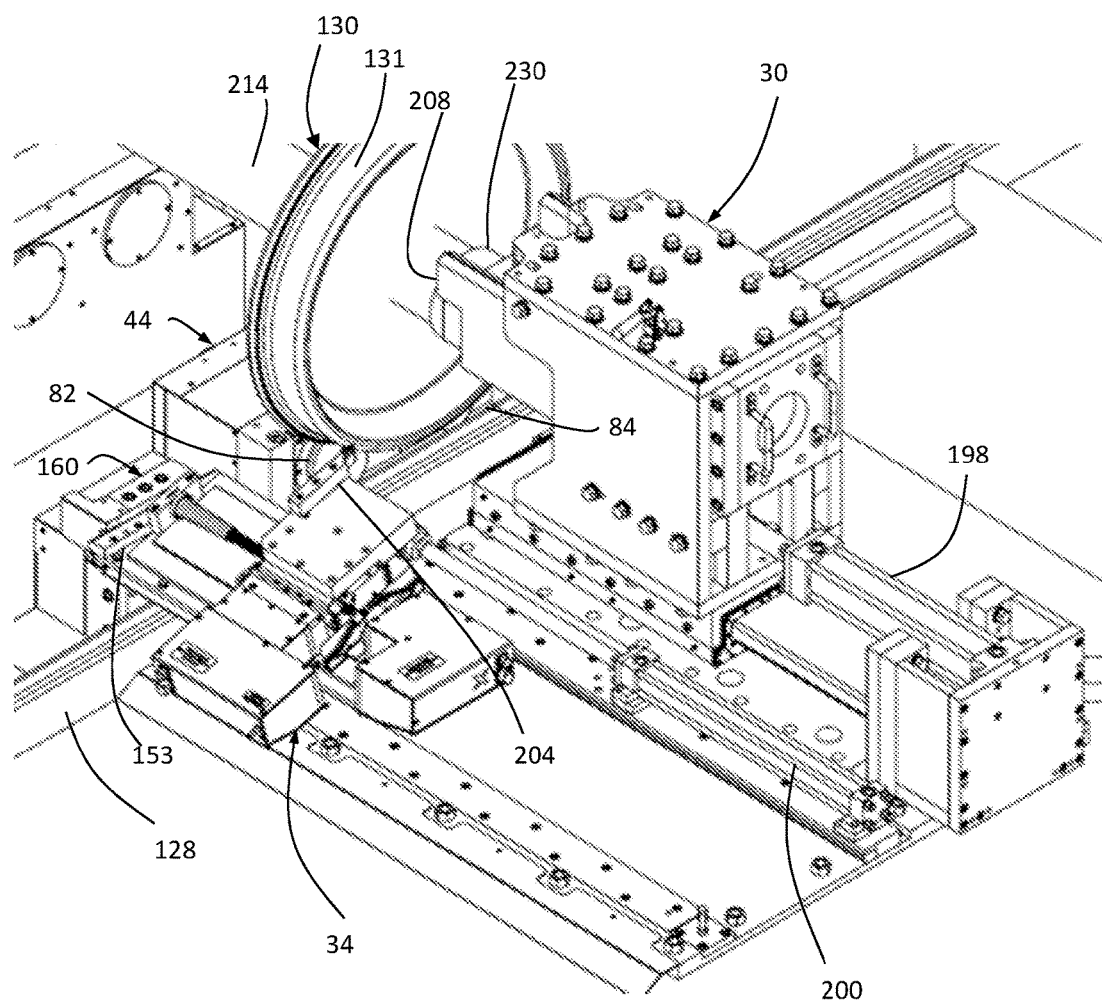
FIG. 14C depicts a close up top perspective view of the single rail axle of FIG. 14 with slave hold down assembly engaged with a slave side journal bearing, and a slave lathe assembly translated medially and secured by a slave capture plate, with the slave lathe assembly in a cut mode wherein a slave lathe cutting tool is engaged with a wheel tread.

FIG. 13 and FIG. 14 illustrate an embodiment of portions of a friction drive locomotive wheel truing system preparing to true railway wheels. FIG. 13 illustrates engagement with a rail truck 216 whereas FIG. 14 illustrates engagement with a single railway axle 214. In this embodiment, a master hold down assembly 28 and a slave hold down assembly 30 prepare to engage ends of the axle 214 and truck to secure it during machining processes. FIG. 14B depicts a single rail axle 214 of FIG. 14 with master and slave clamp faces 206,208 of master and slave hold down assemblies 28,30 engaged with journal bearings 230 of the axle 214 to prevent movement during truing. FIG. 14C depicts a view of the single rail axle of FIG. 14 with slave hold down assembly 30 engaged with a slave side journal bearing 230, and a slave lathe assembly 34 translated medially and secured by a slave capture plate 160 at a capture face 153, and with the slave lathe assembly 34 in a cut mode wherein a slave lathe cutting tool 204 is engaged with a wheel tread 131.

Figure 15:
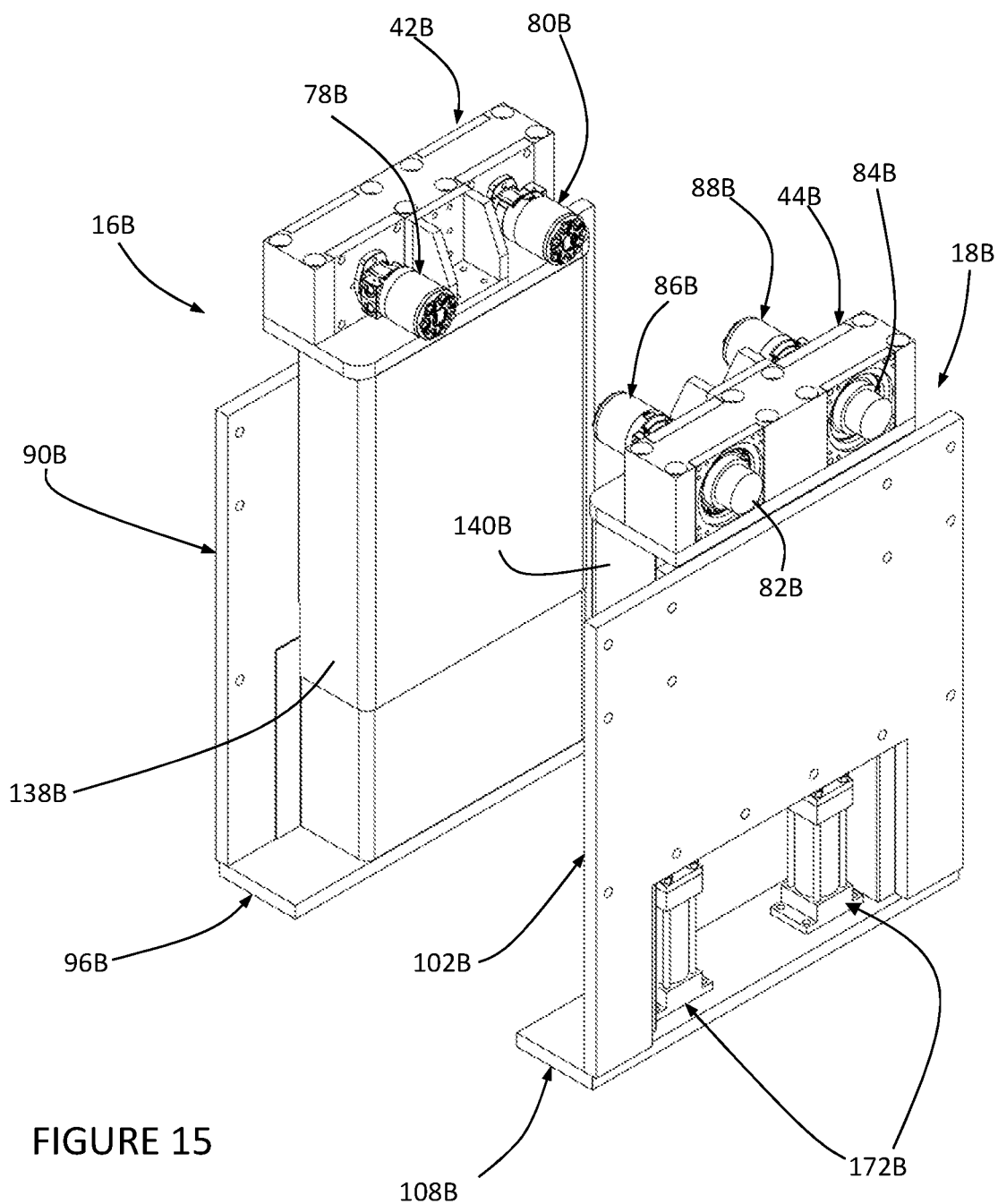
FIG. 15 depicts a top perspective view of a master lift drive arm and a slave lift drive arm according to one or more embodiments shown and described herein.

FIG. 15 illustrates an alternative embodiment of a master lift and drive arm 16B and a slave lift and drive arm 18B. In this embodiment, a pair of slave lift power arms 172B are utilized to cooperatively lift each master drive assembly 42B and slave drive assembly 44B.

Master horizontal mount plate 96B and slave horizontal mount plate 108B are configured to disperse forces from the weight of a rail car to the floor of a pit. The frictional drums operate against the flange of a railway wheel positioned overhead thus lifting and distancing the wheel from a corresponding rail track. In doing so, the wheel is secured between the frictional drums and a holding device in a drive configuration. Drum drive motors linked to each frictional drum are used to rotatably drive a drive surface 83B of a frictional drum against the wheel flange therein causing the wheel to turn. Telescoping master and slave lift covers 138B, 140B comprise an inner tube and an outer tube which are used in this embodiment over the lifting mechanisms to protect users from internal moving parts and pinch points and to protect internal parts of the lift. Lowering of master and slave lift and drive arms 16B, 18B causes a consequent lowering of the wheel on the railway rail and separates the frictional drums from a wheel flange surface in a released configuration.

Figure 16:
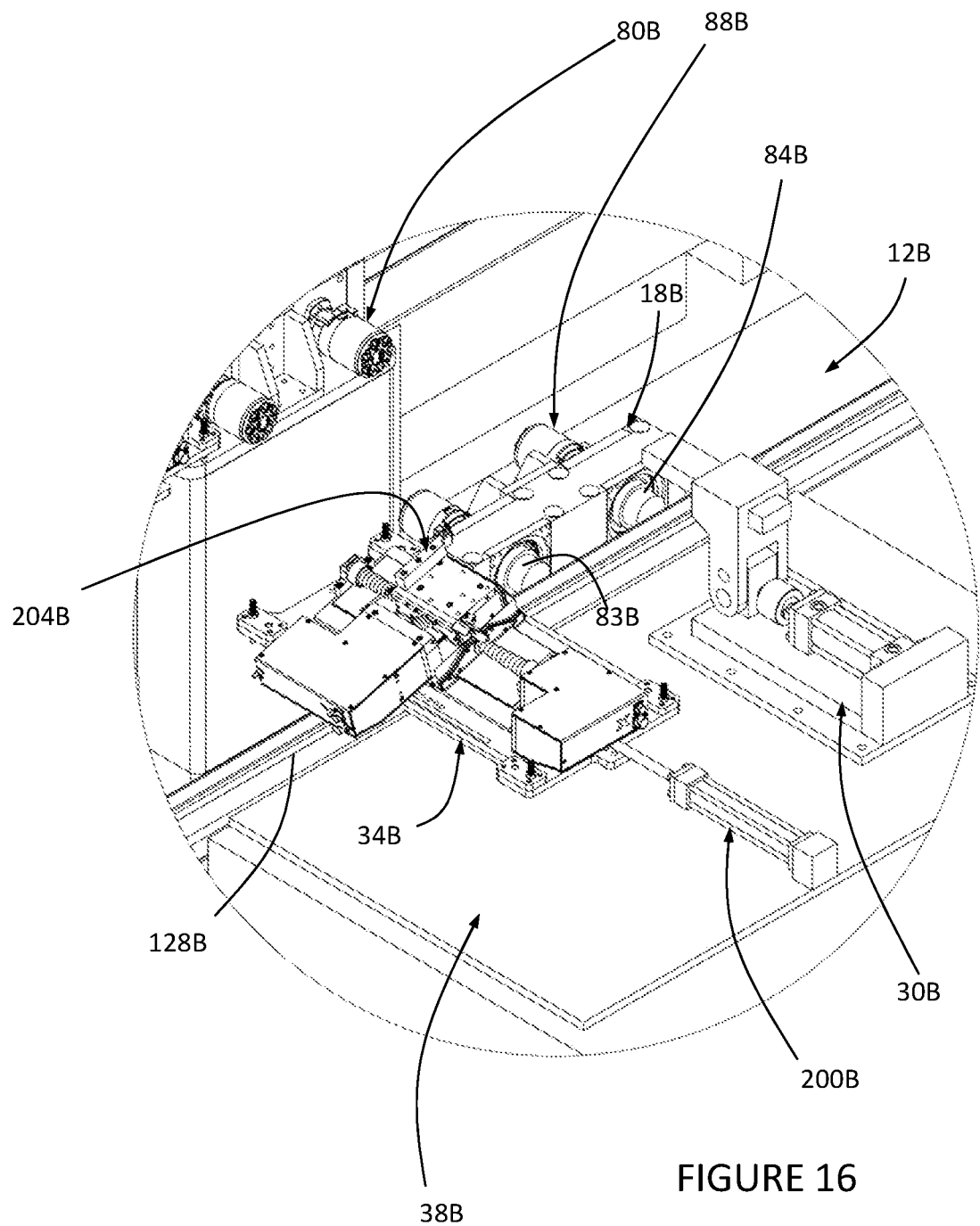
FIG. 16 depicts a partial top perspective view of a slave upper assembly according to one or more embodiments shown and described herein.

FIG. 16 is a top elevational view of one embodiment of a slave lift and drive arm 18B as positioned within a railway pit 12B with adjacent railway rails. A slave lathe power arm 200B is utilized to position the movable lathe between a retracted mode and a cut mode. When the this indexing positioner is activated to move the lathe away from the rail to a retracted mode, the rail is unobstructed for movement of a railway vehicle along the rail. When the slave power arm 200B is activated to move the lathe towards the rail to a cut mode, the lathe cutting blade 204B is positioned to face the tread of a railway wheel in preparation for cutting. In some embodiments the movable lathe may be pivoted away or released from the mount platform. A slave hold down assembly 30B is utilized to secure the position of the wheel about a truing axis (Axis-C) while frictional drum drums push upward on the flange of the wheel to be ground.

Figure 17:
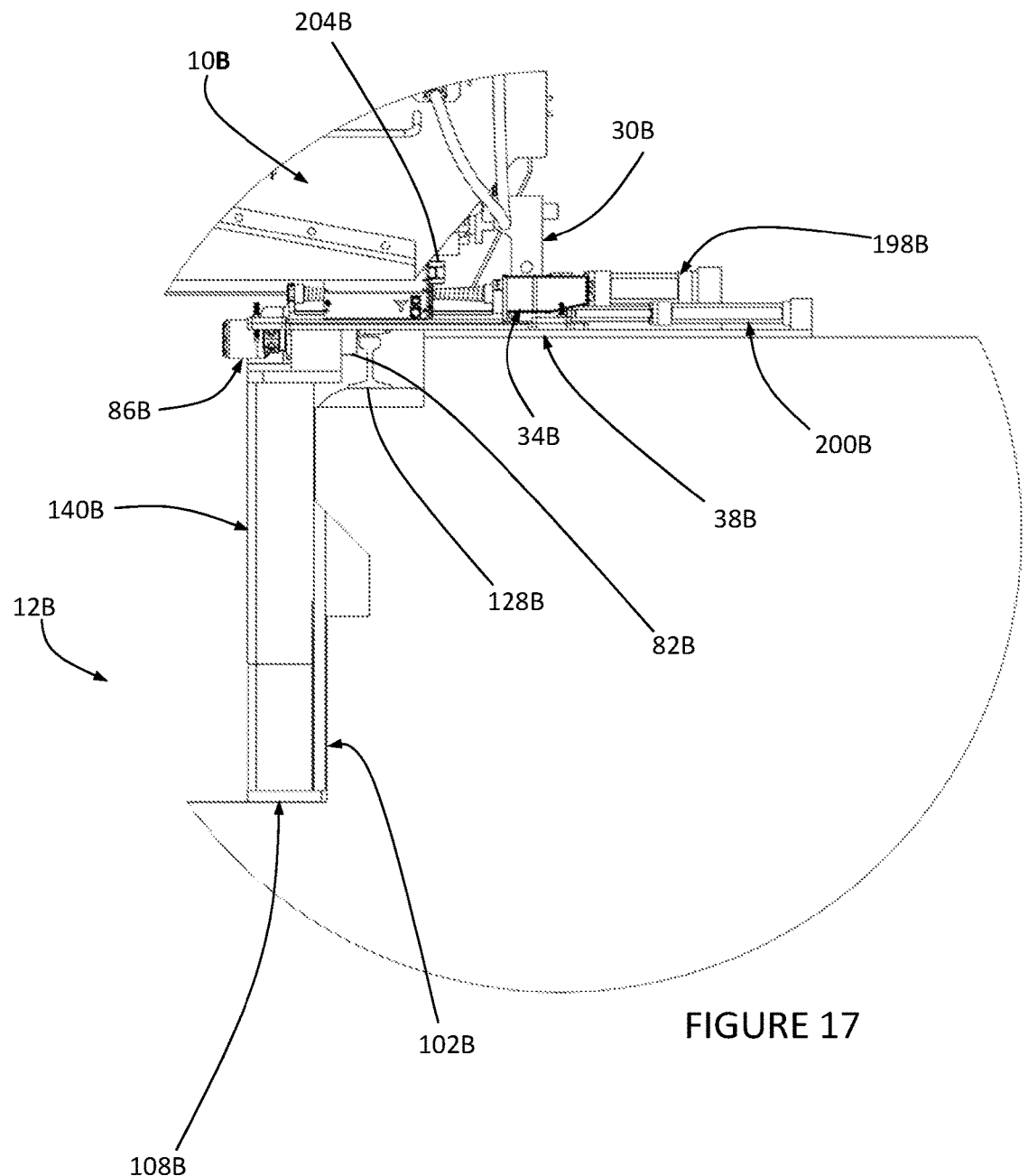
FIG. 17 depicts a partial front cross sectional view of a locomotive on a rail with wheel engaged by a slave lift and drive arm and by a slave upper assembly according to one or more embodiments shown and described herein.

FIG. 17 is a sectional end view of the embodiment of FIG. 16 illustrating a relationship between a locomotive, a slave hold down assembly 30B in an engaged configuration, a slave lathe assembly 34B in a cut mode, and a slave lift assembly 48B in a raised configuration.

Figure 18:
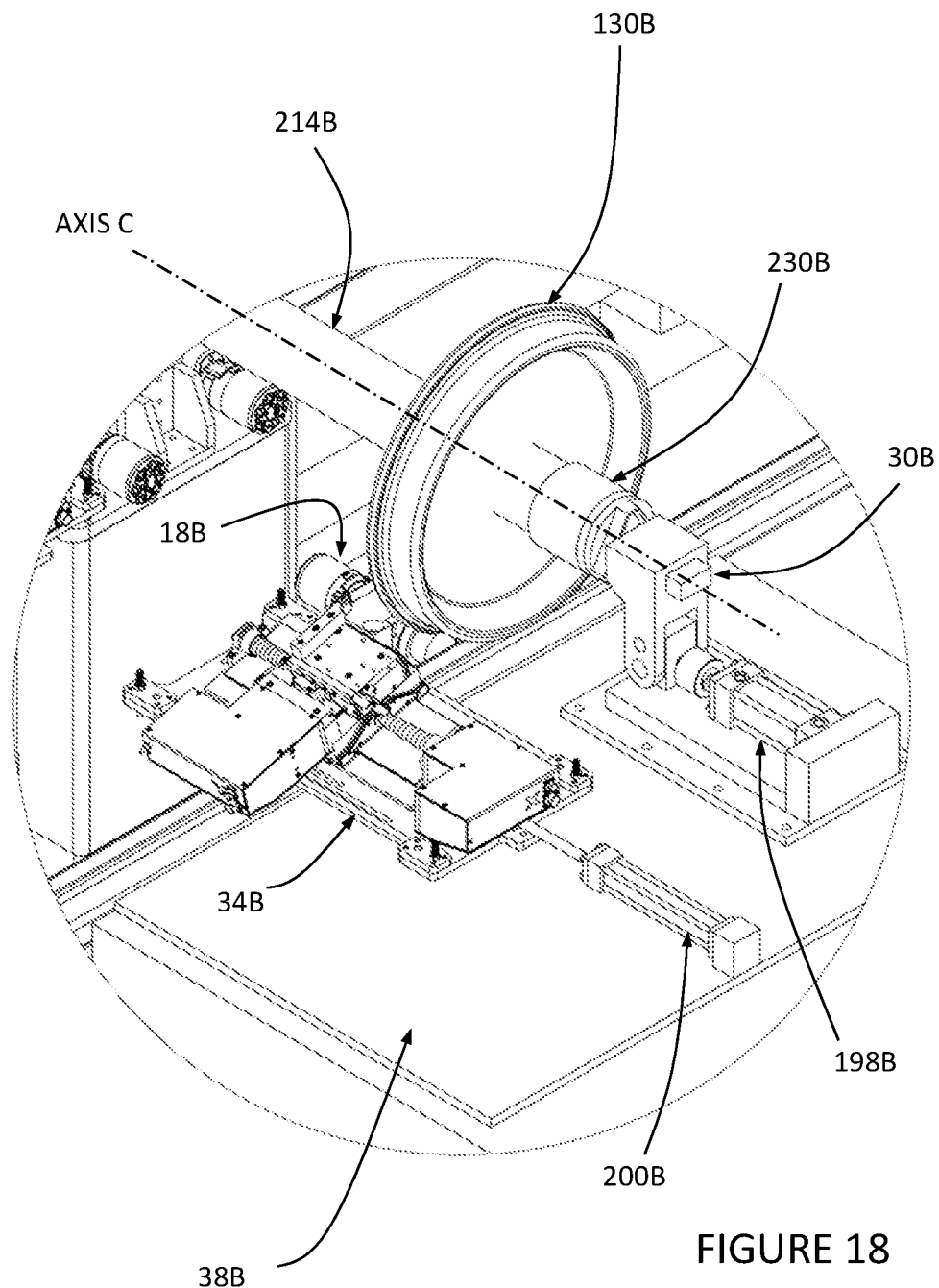
FIG. 18 depicts a partial front perspective view of a single rail axle secured by a slave hold down assembly and engaged by a slave lathe assembly according to one or more embodiments shown and described herein.
Figure 24:
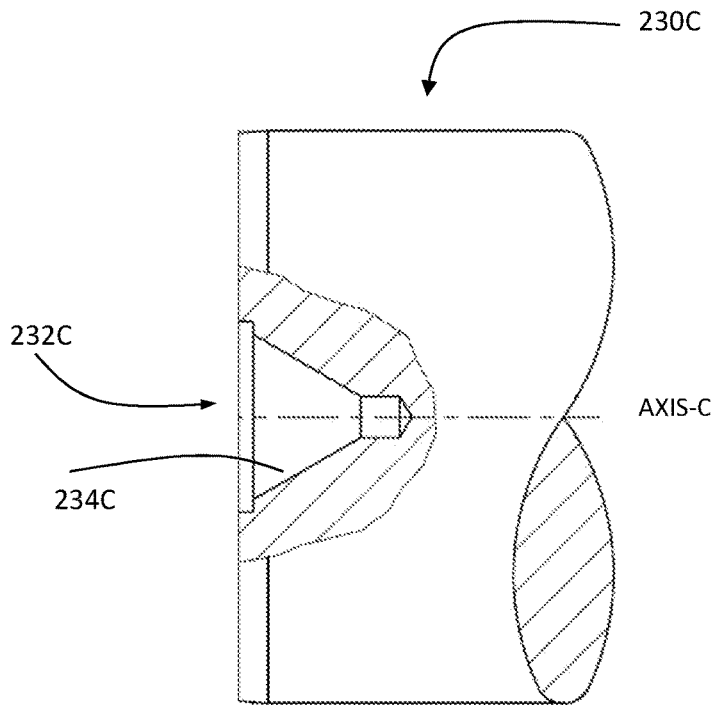
FIG. 24 depicts a partial sectional view of a live center of a journal bearing according to one or more embodiments shown and described herein.

FIG. 18 is a view of an embodiment of a single rail axle 214B positioned for truing on a friction drive wheel lathe truing system in accordance with this disclosure. In this embodiment, a slave hold down assembly 30B engages a bearing along axis C using a live center 232B to hold the railway wheel 130B centered along the axis as a slave lift and drive arm 18B elevates frictional drums against a corresponding wheel flange. FIG. 24 is a cutaway view of a live center 232C portion of a journal bearing 230C for receiving a complementary shaped master or slave clamp face 206, 208 into a holding device receiver 234C portion of a journal bearing 230C.

Figure 19:
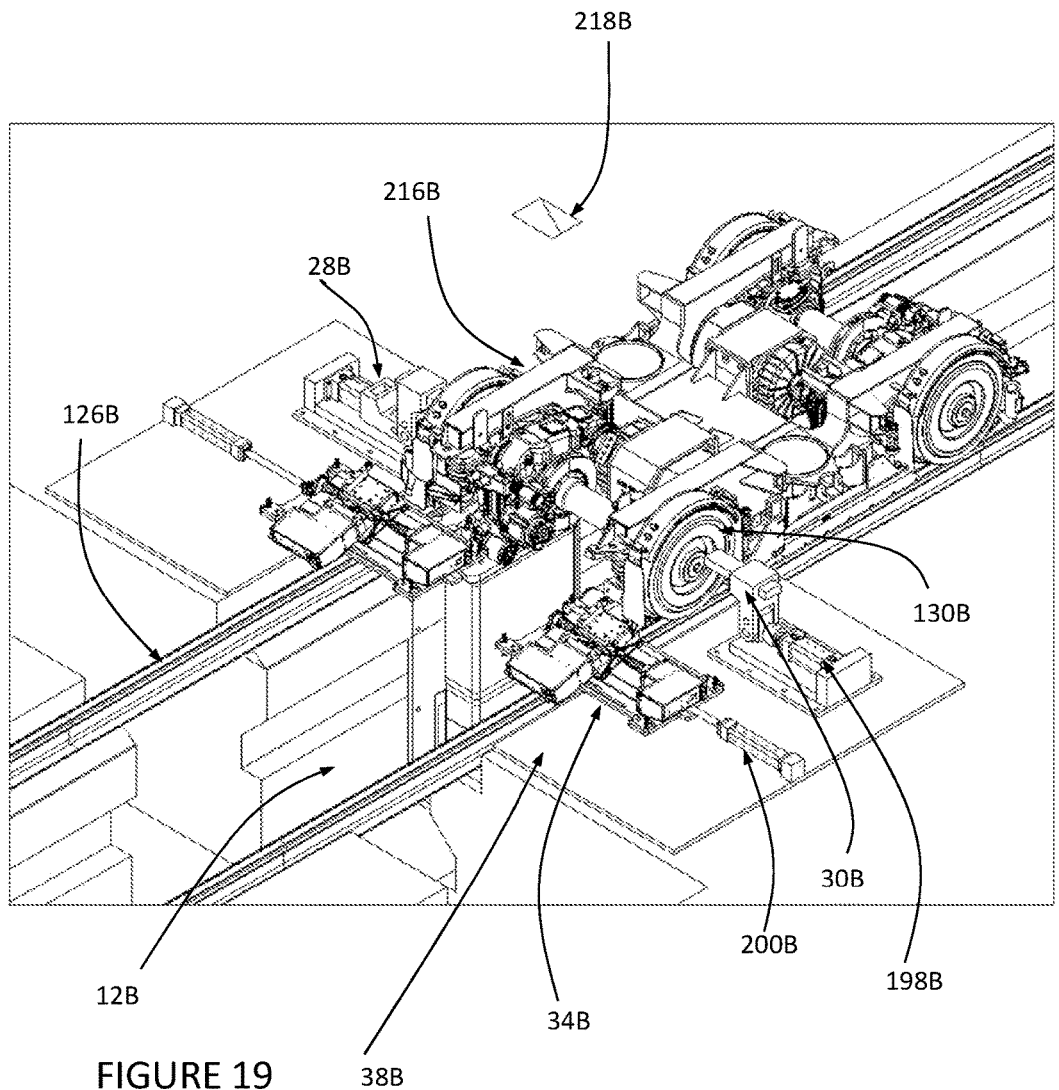
FIG. 19 depicts a top perspective view of a railway truck parked over a pit engaged with the master and slave upper assemblies and pit truing assembly according to one or more embodiments shown and described herein.
Figure 20:
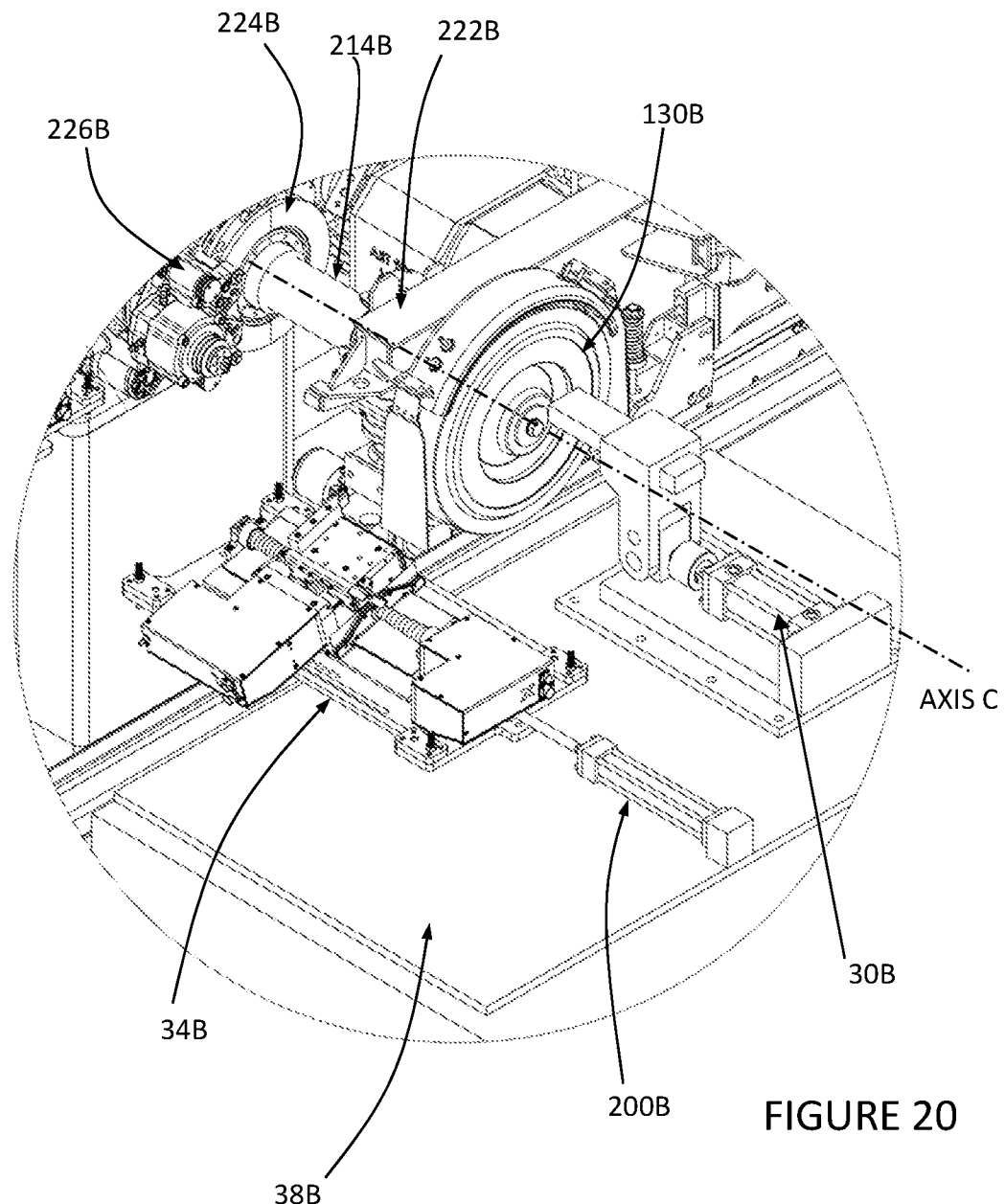
FIG. 20 depicts a partial top perspective view of an axle and wheels of a railway truck engaged with a slave hold down assembly, a slave lathe assembly and slate lift and drive arm according to one or more embodiments shown and described herein.

A truck is a combined unit of typically four wheels configured as a single operational unit on a railway vehicle. FIG. 19 illustrates an embodiment of a truck 216B parked over a pit 12B of a portion of a friction drive locomotive wheel truing system 13B as disclosed herein. Illustrated are master and slave hold down assemblies 28B, 30B and movable master and slave lathe assemblies 32B,34B engaged with two of the railway wheels 130B. FIG. 20 is a close-up top perspective view of the FIG. 19 truck 216B wherein master and slave lift and drive arms in accordance with the instant disclosure holds a frictional drum against a wheel flange. This embodiment illustrates an alternative hold down assembly 222B on axle 214B having a brake rotor 224B and brake caliper 226B.

Figure 21:
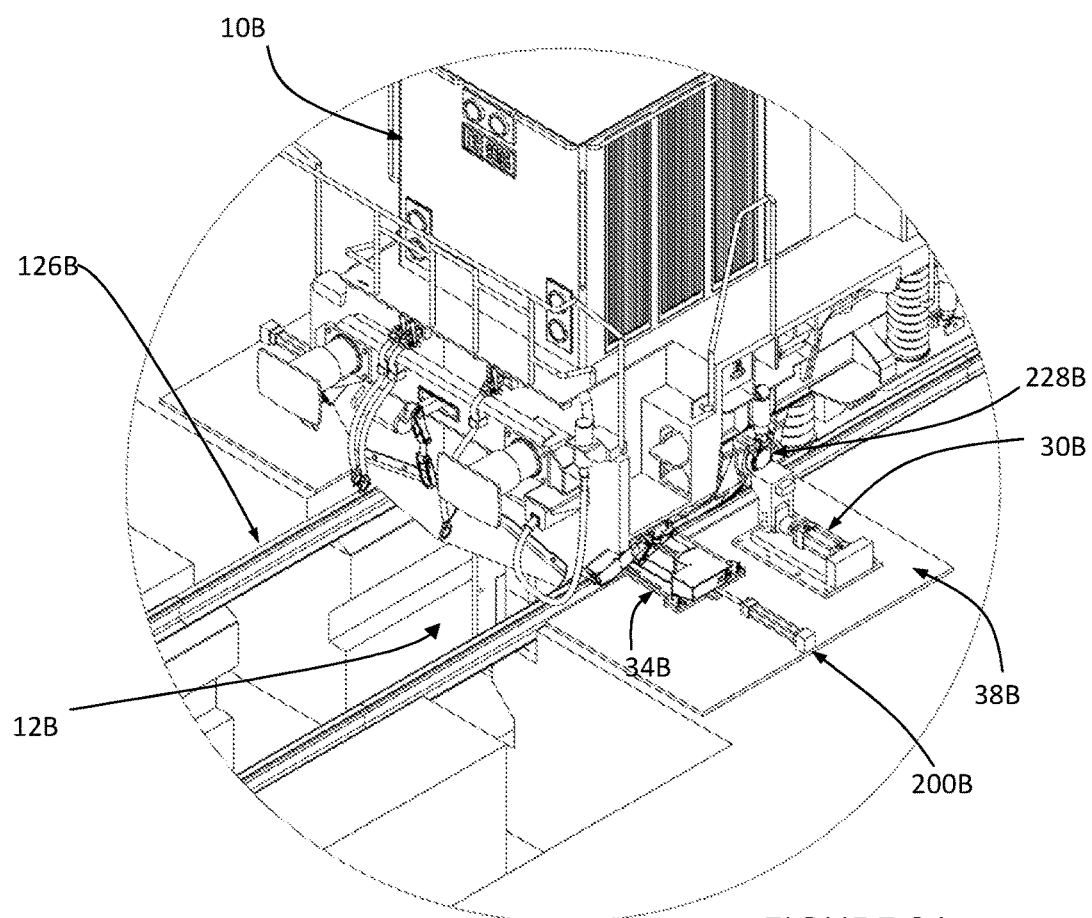
FIG. 21 depicts a partial top perspective view of a locomotive engaged with a slave hold down assembly and a slave lathe assembly according to one or more embodiments shown and described herein.
Figure 22:
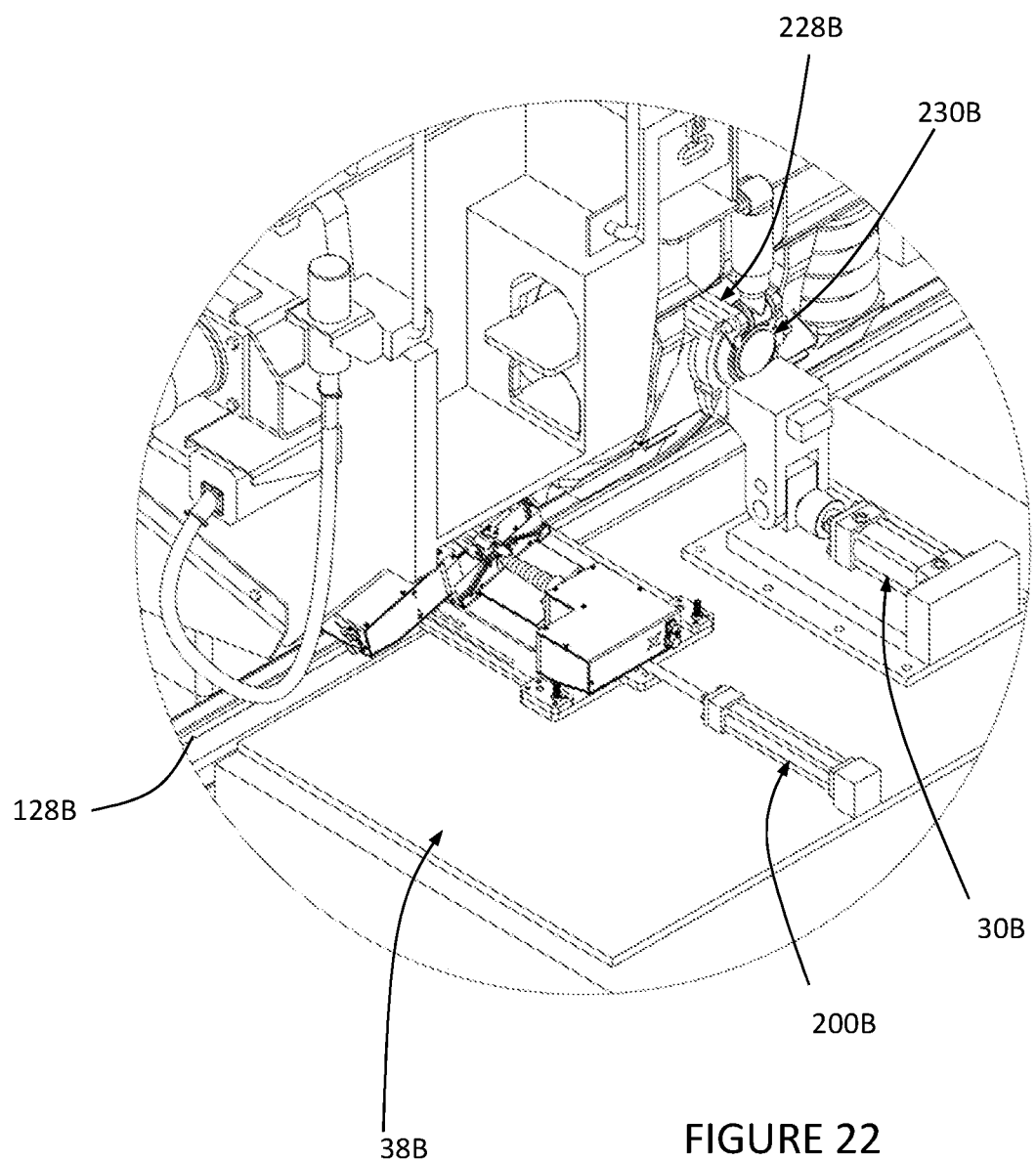
FIG. 22 depicts a close-up view of FIG. 21 of a slave hold down assembly and slave lathe assembly according to one or more embodiments shown and described herein.
Figure 23:
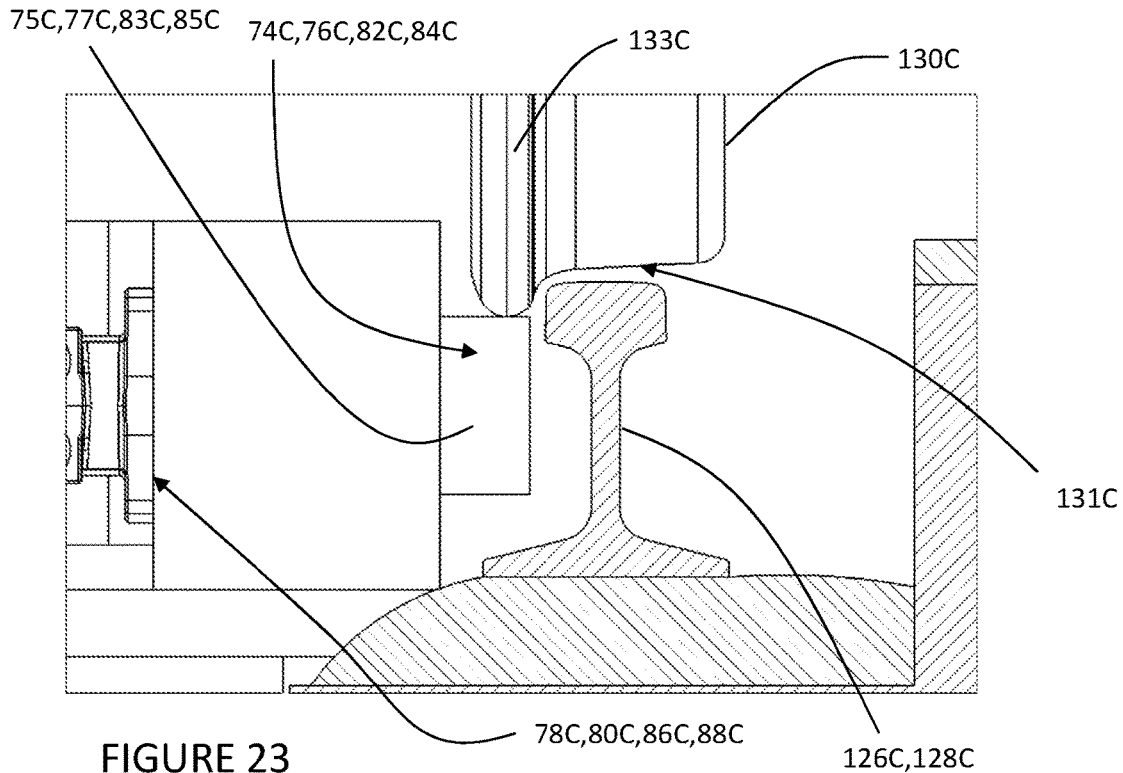
FIG. 23 depicts a front cross sectional view of engagement between a frictional drum and the flange of a railway wheel in an elevated position according to one or more embodiments shown and described herein.

FIGS. 21-22 are top perspective views of a friction drive locomotive wheel truing system engaged with a locomotive 10B. In this embodiment, a master and slave hold down assembly 28B,30B is engaged with a journal box 228B outboard of the wheel to hold the wheel at a predetermined axis during truing of a railway tread 131C.

In preferred embodiments the movable lathe is electronically controlled for truing the tread 131C and flange 133C of a railway wheel 130C by controlling the cutting path of a master and slave lathe cutting tool 202, 204 of a corresponding master or slave lathe assembly 32, 34. In preferred embodiments each of a master and slave lathe assembly comprises two servos. An X-axis servo moves the cutting blade along an axis parallel to Axis-B between a position internal to the wheel to positions external to the wheel. The Y-axis servo moves the cutting blade along an axis perpendicular to Axis-B generally moving towards or away from Axis B. Through computer control of these two servos by master lathe control 54 and slave lathe control 56, a precise computer controlled cutting path can be followed in re-truing a railway wheel 130. Pre-configured cutting paths may be chosen that are particularly suited to differing wheel designs.

Figure 25:
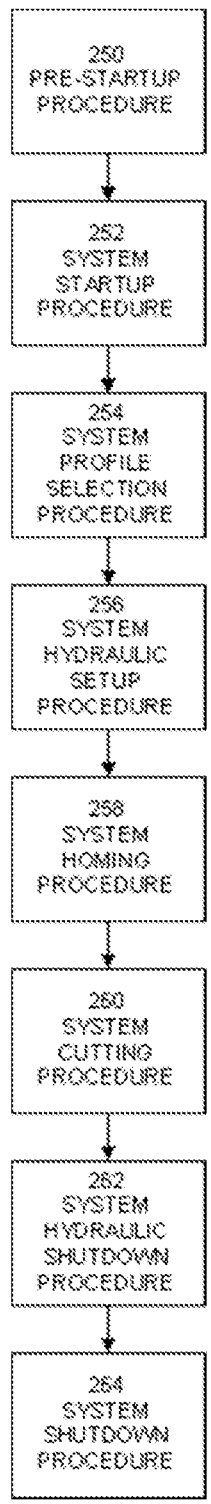
FIG. 25 depicts a flow diagram of operational procedures for one embodiment of a friction drive locomotive wheel truing system according to one or more embodiments shown and described herein.

In one embodiment, operation of a friction drive locomotive wheel truing system 13 comprises a plurality of steps which may be grouped into distinct categories as illustrated in FIG. 25. A first category of steps is a pre-startup procedure 250. A second category is a system startup procedure 252. A third category is a system profile selection procedure 254. A fourth category is a system hydraulic setup procedure 256. A fifth category is a system homing procedure 258. A sixth category is a system cutting procedure 260. A seventh category is system hydraulic shutdown procedure 262. An eighth category is a system shutdown procedure 264.

In a preferred embodiment, a pre-startup procedure 250 comprises the following steps. The operator visually inspects the way lube oil level and hydraulic power unit 62 oil level. The operator then visually inspects the condition of the master and slave cutting tools 202, 204 and tooling, and rotating or replacing the cutting tools if necessary. The railway wheels 130 preparing to be cut are measured preferably starting with the smallest one as this will set a baseline wheel size to which all other wheels are matched.

In a preferred embodiment, a system startup procedure 252 comprises the following steps. The electrical main power switch 58 is turned on. Power on a control of the system and allow the system to complete a booting process if necessary. Once a main screen is displayed, a user engages then disengages an emergency stop associated with the system. The user then checks an emergency stop associated with a hand held control of the system. The main lubrication pumps pressurize and supply the associated master and slave lathe assemblies 32,34 and box ways with a small amount of lubricant.

In a preferred embodiment, a system profile selection procedure 254 comprises the following steps. A profile button on a main screens of the master and slave lathe controls 54,56 displays various wheel profiles that can be cut. A user selects a desired cutting profile and the machine will respond by displaying a hydraulic screen providing a step-by-step machine setup instructions. In this embodiment, the screens are color coded to guide the user through a setup procedure. In a preferred embodiment, a green screen indicates a completed operation. Before continuing through the step by step operation, the user verifies that the laterals (if present) are retracted into a home position. The user then starts a hydraulic pump associated with the system and activates a startup mode. In this embodiment, a control box is used to control the master and slave hold down assemblies 28,30 for in/out and up/down movement. The user verifies the associated master and slave clamp face 206,208 is in the correct location/orientation to capture the corresponding truck or axle. The user then uses in/out and up/down controls to move the hold down assemblies into an anticipated contact position with the predetermined axle or journal box of the vehicle. The user then activates a control to the master and slave lift and drive arms 16,18 to lift the railroad wheels off the rails 126,128 while using the hold down assemblies to keep the wheels centered on a wheel axis. The user then activates the machine to apply constant pressure to the frictional drums 74,76,82,84 for traction. The master and slave capture plate assemblies 20, 22 are now elevated from an uncaptured mode to a captured mode.

In a preferred embodiment, a system homing procedure 258 comprises the following steps. A display is activated to guide a user through steps to set wheel home location. A master lathe assembly 32 and slave lathe assembly 34 are operated separately using controls to select one of them. Controls are activated to translate medially both master lathe assembly 32 and slave lathe assembly 34 until a medial portion of the lathe assemblies are seated within the capture faces 153 of the master and slave capture plates 152,160. Controls are activated to start the friction drive start procedure. A predetermined master lathe or slave lathe is selected. Using directional lathe controls, such as a directional pad on a remote control, a user moves the corresponding lathe to a desired position. In preferred embodiments, a dead man switch is required to be activated by a user when using the remote control to control each lathe. Using the directional controls for a master lathe, the user moves the corresponding lathe along axis B medially and along a Y axis (perpendicular to axis B) in an up direction until the corresponding cutting tool is on top and about ⅛" away from the wheel flange. The user then activates controls that advance the lathe cutting tool towards the wheel. In some embodiments the cutting tool is controllably advanced in increments of 0.010" and 0.001" until the cutting bit lightly scores the top of the wheel flange. At this point the user activates a control setting this "Y" position. In preferred embodiments, the corresponding lathe distances itself from the wheel ¹⁄₁₆", moves left or right and up to a flat on a back side of the wheel. The user again activates controls to move the lathe along axis B until the insert is approximately ⅛" away from the back side of the corresponding wheel. The user then activates controls that advance the lathe cutting tool towards the wheel. Again, in some embodiments the cutting tool is controllably advanced in increments of 0.010" and 0.001" until the cutting bit lightly scores the top of the wheel flange. At this point the user activates a control setting this "Y" position causing the lathe to back away from the corresponding wheel, move to the left or right and up to the flat of the back side of the wheel. The user again activates controls to move the corresponding lathe to the until the insert is spaced about ⅛" from the back side of the wheel. The cutting tool is controllably advanced until the cutting tip lightly scores the back side of the wheel. The user activates a control setting this "X" position in memory. The lathe responds by backing the cutting tool away from the wheel and returning to a home position.

In a preferred embodiment, a system cutting procedure 260 comprises the following steps. A system displays a cutting page upon completion of a homing procedure. The system defaults at a reduced wheel speed such as a 50% speed reduction. The user then sets a desired depth of cut for each lathe preferably beginning with a depth of cut of zero. The user then activates controls on the system causing starting of the cutting process. In some embodiments, the user will utilize a remote control to select control over the master and slave lathe assemblies 32,34. In some embodiments, starting both lathes, stopping both lathes, and retracting both lathes may be activated by exercising control over a single set of controls that simultaneously control both lathes at the same time. In some embodiments, a user may activate controls to speed up and slow down to reach a desired speed. This feature may be used for example to slow the lathe down when hard spots on the wheel are present. During the cutting process, the user may activate controls to; return the lathe feed rate to its default speed, stop the lathe, resume cutting, return the lathe to its home position for example if a change of cutting tools are needed, and to resume cutting. In preferred embodiments, each lathe will return to its home position after cutting action and the master and slave capture plates will return to an uncaptured mode by moving inferiorly. The user then inspects the wheel and may opt to continue cutting options until the wheel is fully rehabilitated. The user then activates controls to stop the frictional drums then takes final measurements of the wheels, inspects lathe cutting machine, the axles, and trucks. Metal chips from the cutting operation are moved away.

In a preferred embodiment, a hydraulic shutdown procedure 262 comprises the following steps. A user activates controls on the system that causes shutdown initiation of the system hydraulics. Controls are then activated to retract laterals (if present) to their home position which may be followed by the user activating a control to confirm the laterals are in their home position.

In a preferred embodiment, a hydraulic shutdown procedure 262 comprises the following steps. A user activates controls to interrupt power to the HMI (human machine interface-remote) control. Electrical mains are moved to an interrupted position. The system shutdown is now complete.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A frictional drive railway wheel truing system comprising:
   a master lift and drive arm spaced from a slave lift and drive arm extending from within a railway pit for lifting a pair of opposed railway wheels off a pair of spaced railway rails;
   said master lift and drive arm and said slave lift and drive arm moveable between a lowered mode and a raised mode along a generally vertical axis;
   said master lift and drive arm comprising a master drive assembly at a superior end of said first master lift and drive arm;
   said slave lift and drive arm comprising a slave drive assembly at a superior end of said slave lift and drive arm;
   each of said master drive assembly and slave drive assembly comprising a pair of frictional drums spaced less than a diameter of a railway wheel for cupping a railway wheel there between;

said pair of frictional drums driven by at least one drum drive motor for driving rotation of a railway wheel during a wheel truing operation;

said frictional drums having a drive surface configured for engaging a flange of a railway wheel for lifting and driving the railway wheel in rotation;

a master lathe assembly moveable along an axis generally parallel to a rotational axis of one of said pair of frictional drums;

a slave lathe assembly moveable along an axis generally parallel to a rotational axis of one of said pair of frictional drums;

each of said master and said slave lathe assemblies having a cutting bit positioned to engage a tread and a flange of a railway wheel;

said cutting bit positioned in a cut mode to engage said tread and flange of a railway wheel at a location superior to the contact area of said frictional drums and railway wheel;

and a hold down assembly fixing rotation of a railway wheel to a predetermined axis during a wheel truing operation.

2. The frictional drive railway wheel truing system of claim 1 further comprising a master vertical mount plate and wherein said master lift and drive arm is secured to said master vertical mount plate which is fixed to a vertical wall of a railway pit.

3. The frictional drive railway wheel truing system of claim 1 wherein railway rails above the railway pit remain in place during wheel truing operations.

4. The frictional drive railway wheel truing system of claim 1 wherein a master base plate supporting said master lathe assembly is secured to a master deck.

5. The frictional drive railway wheel truing system of claim 1 wherein a hold down assembly engages a journal box of a railway axle during truing operations.

6. The frictional drive railway wheel truing system of claim 1 wherein a hold down assembly and a lathe assembly translate above a deck in a direction generally perpendicular to a railway rail.

7. The frictional drive railway wheel truing system of claim 1 further comprising a master lift cover covering a master lift portion of said master lift and drive arm, and a slave lift cover covering a slave lift portion of said slave lift and drive arm, and wherein said master lift cover and said slave lift cover are horizontally distanced by 15 inches or more.

8. The frictional drive railway wheel truing system of claim 1 wherein said frictional drive railway wheel truing system is configured for fit and assembly within a preexisting railway pit.

9. The frictional drive railway wheel truing system of claim 1 wherein a portion of at least one of said master lathe assembly and said slave lathe assembly extends over a top surface of a railway rail during wheel truing operations.

10. The frictional drive railway wheel truing system of claim 1 wherein in a retracted mode at least one of said master lathe assembly and said slave lathe assembly are laterally retracted from a position directly over a top surface of a railway rail.

11. The frictional drive railway wheel truing system of claim 1 wherein a medial end of a master lathe assembly is stabilized by a master capture plate assembly in a cut mode.

12. The frictional drive railway wheel truing system of claim 1 wherein a master capture plate is elevated superiorly in a capture mode for stabilizing a master lathe assembly.

13. The frictional drive railway wheel truing system of claim 1 wherein said master lathe assembly and said slave lathe assembly reside outside lateral to a railway pit in a retracted mode.

14. The frictional drive railway wheel truing system of claim 1 wherein at least one of a master and slave hold down assembly engages with a live center of a railway wheel to keep the wheel centered.

15. The frictional drive railway wheel truing system of claim 1 wherein a horizontally placed main plate extends between a master vertical mount plate and a slave vertical mount plate.

16. The frictional drive railway wheel truing system of claim 1 wherein both said master lathe assembly and said slave lathe assembly are positioned in front of respective said master hold down assembly and said slave hold down assembly above a respective master deck and slave deck.

17. The frictional drive railway wheel truing system of claim 1 wherein both a master lathe cutting tool and slave lathe cutting tool simultaneously engage treads on respective master side railway wheel and slave side railway wheel.

18. The frictional drive railway wheel truing system of claim 1 used to true wheels on one or more of a railway axle, a rail truck, a rail car, and a railway locomotive.

19. The frictional drive railway wheel truing system of claim 1 wherein a master hold down assembly and a master lathe assembly are secured to a master base plate fixed to a master deck.

20. The frictional drive railway wheel truing system of claim 1 wherein a master lift and drive arm and a master capture plate assembly are housed within a railroad pit.

* * * * *